US012585171B2

(12) United States Patent
Tsuchiya et al.

(10) Patent No.: US 12,585,171 B2
(45) Date of Patent: Mar. 24, 2026

(54) IN-VEHICLE CAMERA REAR CASE AND IN-VEHICLE CAMERA CASE

(71) Applicant: SMK Corporation, Tokyo (JP)

(72) Inventors: Hirotaka Tsuchiya, Tokyo (JP); Fumio Osawa, Tokyo (JP); Tadahito Sasaki, Tokyo (JP)

(73) Assignee: SMK Corporation, Tokyo (JP)

( * ) Notice: Subject to any disclaimer, the term of this patent is extended or adjusted under 35 U.S.C. 154(b) by 138 days.

(21) Appl. No.: 18/424,878

(22) Filed: Jan. 29, 2024

(65) Prior Publication Data

US 2025/0028225 A1 Jan. 23, 2025

(30) Foreign Application Priority Data

Jul. 19, 2023 (JP) ................................. 2023-117313

(51) Int. Cl.
*G03B 17/08* (2021.01)
*H04N 23/51* (2023.01)
*H04N 23/57* (2023.01)

(52) U.S. Cl.
CPC ............. *G03B 17/08* (2013.01); *H04N 23/51* (2023.01); *H04N 23/57* (2023.01)

(58) Field of Classification Search
None
See application file for complete search history.

(56) References Cited

U.S. PATENT DOCUMENTS 6,295,103 B1 * 9/2001 Yamatani .......... G02F 1/133308
361/801
10,442,369 B2 * 10/2019 Hehir ..................... B60R 11/04

10,601,191 B2 * 3/2020 Yamazaki .............. H01R 24/54
2015/0029337 A1 1/2015 Uchiyama
2018/0006407 A1 * 1/2018 Sasaki .................... H01R 24/40
2021/0313746 A1 * 10/2021 Kato .................. H01R 13/6215
2021/0384680 A1 * 12/2021 Yamazaki ............ H01R 12/716
2022/0115813 A1 4/2022 Tsuchiya
(Continued)

FOREIGN PATENT DOCUMENTS

JP H10209663 A 8/1998
JP H1174659 A 3/1999
(Continued)

OTHER PUBLICATIONS

Office Action issued for related Japanese Application No. 2023-117313, transmitted from the Japanese Patent Office on Sep. 5, 2023 (drafted on Aug. 28, 2023).

*Primary Examiner* — Rodney E Fuller

(57) ABSTRACT

An in-vehicle camera rear case includes: a rear case main body that is connected to a front case in an opposed manner, is provided with an insertion hole, is opened at one surface, and has a box shape; a connector module that electrically connects an external connector to an in-vehicle camera substrate, is inserted in the insertion hole, and is engaged with the rear case main body, and at least a part of which is made of a resin; and a housing that is engaged with the connector module. The rear case main body includes: boss members that are provided on a surface of an internal surface side rear case upper surface; and crimping reception surfaces provided on an external surface side rear case upper surface. The flange reception surface boss members are crimped in a state of being engaged with the connector module.

20 Claims, 15 Drawing Sheets

(56) References Cited

U.S. PATENT DOCUMENTS

| | | | | | |
|---|---|---|---|---|---|
| 2022/0158383 A1 | * | 5/2022 | Sasaki | .................. | H01R 13/405 |
| 2024/0243510 A1 | * | 7/2024 | Tanaka | ................. | H01R 13/512 |

FOREIGN PATENT DOCUMENTS

| | | | | | | |
|---|---|---|---|---|---|---|
| JP | 2005347243 | A | | 12/2005 | | |
| JP | 2008162125 | A | * | 7/2008 | .......... | B29C 66/114 |
| JP | 6039514 | B2 | | 12/2016 | | |
| JP | 2017102338 | A | * | 6/2017 | | |
| JP | 2019046963 | A | | 3/2019 | | |
| JP | 2022063568 | A | | 4/2022 | | |
| JP | 2023046667 | A | * | 4/2023 | ............ | H01R 24/52 |
| WO | 2009050982 | A1 | | 4/2009 | | |

* cited by examiner

IN-VEHICLE CAMERA REAR CASE AND IN-VEHICLE CAMERA CASE

CROSS-REFERENCE TO RELATED APPLICATIONS

This application claims the priority benefit under 35 U.S.C. § 119 of Japanese Patent Application No. 2023-117313 filed on Jul. 19, 2023, which is hereby incorporated in its entirety by reference.

FIELD

The present invention relates to an in-vehicle camera rear case and an in-vehicle camera case which include a connector module and the like.

BACKGROUND

In many cases, an in-vehicle camera case is formed by connecting a front case on the front side to a rear case on the rear side. Also, such an in-vehicle camera case houses an in-vehicle camera therein, and electrically connects an external connector to an in-vehicle camera substrate via a connector module that is included in the in-vehicle camera case. In such an in-vehicle camera case that includes a connector module, a structure for fixing and connecting the in-vehicle camera case to the connector module has been known.

Specifically, known as those having such a structure is an electronic device module that includes a case (in-vehicle camera case) made of metal and provided with at least one boss, an electronic device unit housed in the case, an external device connection connector terminal electrically connected to the electronic device unit and used to be connected to an external device, and a metal ground shell (connector module) that is disposed to surround the external device connection connector terminal, that has a metal coating layer on its surface, and that is provided with at least one boss insertion part corresponding to the at least one boss of the case (for example, refer to Patent Literature 1).

In the electronic device module disclosed in Patent Literature 1, the head of the boss, which is exposed at the surface of the ground shell, is heated and melted, for example, by irradiation with a laser beam and is welded to the coating layer located around the boss insertion part to fix and connect the case (in-vehicle camera case) to the ground shell (connector module).

However, in general, the ground shell (connector module) is made of not only a metal material but also, in the surrounding exterior of the ground shell, a component that is weak against heat, such as a resin-made component. Actually, in the example of Patent Literature 1, an internal housing 20 provided in the surrounding exterior of a ground shell 18 is made of a resin, and a waterproof member 29 is made of a rubber. In such a configuration, when the boss of the case is welded to the coating layer of the ground shell, components that are weak against heat, such as the ground shell 18 and the internal housing 20, may be deformed and broken. As a result, the production of defective products may occur at a certain frequency.

SUMMARY

The present invention has been made in view of these problems, and an object thereof is to provide an in-vehicle camera case or in-vehicle camera rear case capable of reducing the occurrence frequency of defective products at the time of manufacture while maintaining the structural strength of the in-vehicle camera case or in-vehicle camera rear case.

To achieve the aforementioned object, an in-vehicle camera rear case according to an aspect of the present invention includes: a rear case main body that is connected to a front case in an opposed manner to form a space in which an in-vehicle camera is housed, is provided with an insertion hole, is opened at one surface, and has a box shape; a connector module that is inserted in the insertion hole and is engaged with the rear case main body, and at least a part of which projecting out of the rear case main body is made of a resin; and a housing that is engaged with the connector module and houses the connector module. The rear case main body includes: a rear case upper surface opposed to the front case; a plurality of rear case side surfaces provided perpendicularly along an outer periphery of the rear case upper surface; a boss member that projects in a vertical direction from the rear case upper surface toward an internal surface side of the rear case main body and is provided on a surface of the rear case upper surface on the internal surface side to be engaged with the connector module; and a crimping reception part provided at a position, opposed to the boss member, on a surface of the rear case upper surface, which is on an external surface side of the rear case main body. The boss member is crimped in a state of being engaged with the connector module.

With this configuration, in the in-vehicle camera rear case according to an aspect of the present invention, the connector module is fixed and connected to the rear case main body not by using a method that generates heat such as welding but by crimping the boss member, which projects in the vertical direction from the rear case upper surface of the rear case main body toward the internal surface side, in a state where the boss member is engaged with the connector module. No heat is generated when fixing and connecting components by means of crimping. Hence, even when a part of the connector module is made of a resin, the part made of a resin will not be deformed or broken by heat. Accordingly, the occurrence frequency of defective in-vehicle camera rear cases at the time of manufacture can be reduced.

Also, in the method that utilizes crimping, pressure is applied to the rear case upper surface, which is provided with the boss member. In the in-vehicle camera rear case according to an aspect of the present invention, the crimping reception part can receive the pressure applied to the rear case upper surface at the time of crimping since the crimping reception part is provided at the position, opposed to the boss member, on the surface of the rear case upper surface, which is on the external surface side of the rear case main body. Therefore, even in a case where the connector module is fixed and connected to the rear case main body by means of crimping, the structural strength of the in-vehicle camera rear case can be maintained.

In the in-vehicle camera rear case configured as above, the connector module may include a shell that serves as a conductor made of metal and includes a cylindrical portion, a terminal that is arranged along a central axis inside the shell and is conductive from one end to another end thereof, and an insulator that is provided between the shell and the terminal, holds the terminal, and has an insulation property.

With this configuration, in the in-vehicle camera rear case according to an aspect of the present invention, the terminal that is conductive from the one end to the other end thereof can electrically connect the in-vehicle camera to the outside in an effective manner.

In the in-vehicle camera rear case configured as above, the shell may further include a flange part that is provided with a plurality of engagement holes, is engaged with the rear case main body and the housing, and has a flat plate shape. When the flange part is engaged with the boss member of the rear case main body, the boss member may penetrate the plurality of engagement holes.

With this configuration, in the in-vehicle camera rear case according to an aspect of the present invention, since the shell includes the flat-plate-like flange part provided with the plurality of engagement holes, the shell can easily be engaged with the rear case main body and the housing.

In the in-vehicle camera rear case configured as above, the shell may include a shell flange having a larger outside diameter and a shell O ring for waterproofing to be fitted between the shell flange and an internal surface of the housing.

With this configuration, in the in-vehicle camera rear case according to an aspect of the present invention, since the shell O ring for waterproofing is fitted between the shell flange and the internal surface of the housing, it is possible to prevent water from flowing through the shell into the in-vehicle camera rear case.

In the in-vehicle camera rear case configured as above, the rear case main body may be provided with a flange reception surface, which is formed as a recess for receiving the flange part, on the surface of the rear case upper surface on the internal surface side, and the boss member may be provided on the flange reception surface.

With this configuration, in the in-vehicle camera rear case according to an aspect of the present invention, the flange reception surface as a recess receiving the flange part is provided on the surface of the rear case upper surface on the internal surface side, and the boss member is provided on the flange reception surface. As a result, the dimension of the interior of the rear case main body in the height direction, which is a direction perpendicular to the rear case upper surface, can be reduced. Accordingly, the in-vehicle camera can be housed in an in-vehicle camera case even in a case where the in-vehicle camera to be housed in the in-vehicle camera case is large in size.

In the in-vehicle camera rear case configured as above, the insertion hole may have a circular shape and be formed at a center of the rear case upper surface.

With this configuration, in the in-vehicle camera rear case according to an aspect of the present invention, since the insertion hole is formed at the center of the rear case upper surface, this configuration is suitable for a case where one wishes to arrange a camera substrate in the in-vehicle camera case connected to the connector module at a position opposed to the center of the rear case upper surface.

In the in-vehicle camera rear case configured as above, four sides serving as an outer periphery of the rear case upper surface are referred to as a first side, a second side, a third side, and a fourth side. The first side and the third side are opposed to each other. The second side and the fourth side are opposed to each other. A closest distance from an outer edge of the insertion hole to the first side is referred to as L1, a closest distance to the second side is referred to as L2, a closest distance to the third side is referred to as L3, and a closest distance to the fourth side is referred to as L4. In this case, a position of the insertion hole may be displaced from the center of the rear case upper surface so that the L1 and the L3 have different values.

With this configuration, in the in-vehicle camera rear case according to an aspect of the present invention, since the insertion hole is formed at a position displaced from the center of the rear case upper surface toward the first side or the third side, this configuration is suitable for a case where one wishes to arrange the camera substrate in the in-vehicle camera case connected to the connector module at a position opposed to the position displaced from the center of the rear case upper surface toward the first side or the third side.

In the in-vehicle camera rear case configured as above, furthermore, the position of the insertion hole may be displaced from the center of the rear case upper surface so that the L2 and the L4 have different values.

With this configuration, in the in-vehicle camera rear case according to an aspect of the present invention, furthermore, since the insertion hole is formed at a position displaced from the center of the rear case upper surface toward the second side or the fourth side, this configuration is suitable for a case where one wishes to arrange the camera substrate in the in-vehicle camera case connected to the connector module at a position opposed to the position displaced from the center of the rear case upper surface toward the second side or the fourth side, that is, a position on a corner side of the rear case upper surface.

In the in-vehicle camera rear case configured as above, the boss member, which is at least one boss member on a shorter one out of the L1 and the L3, may be a side surface boss provided on an internal surface side rear case upper surface, and the side surface boss may be crimped in a state where the flange part is engaged with the flange reception surface.

In a case where the insertion hole is displaced from the center of the rear case upper surface, there may be no space for a structure where the boss is formed on the rear case and is inserted into the engagement hole of the flange part. In a case where the flange part cannot be fixed by the boss, the shell cannot reliably be fixed to the rear case. However, with the above configuration, even in a case where the space to form the boss member on the internal surface side rear case upper surface is small, the side surface boss is provided, whereby the flange part of the shell can reliably be fixed to the rear case.

In the in-vehicle camera rear case configured as above, the side surface boss may be formed to extend from the rear case side surface.

The side surface boss is crimped to fix the flange part of the shell to the rear case. In the above configuration, by configuring the side surface boss to extend from both the internal surface side rear case upper surface and the rear case side surface, the flange part of the shell can be fixed to the rear case more firmly than in a case of configuring the side surface boss to extend only from the internal surface side rear case upper surface. The reason for this is that, in a case where the shell receives a load in a direction perpendicular to the internal surface side rear case upper surface, the load that the side surface boss has received can be applied to not only the connection portion to the internal surface side rear case upper surface but also the connection portion to the rear case side surface. In other words, the reason is that the load can be distributed in different directions.

In the in-vehicle camera rear case configured as above, the boss member, which is at least one boss member, may be a side surface boss provided at a corner on an internal surface side rear case upper surface, and the side surface boss may be crimped in a state where the flange part is engaged with the flange reception surface.

The appropriate position and the like to provide the side surface boss differ depending on the size and the shape of the flange part. The aforementioned configuration, in which the side surface boss is provided at the corner on the internal surface side rear case upper surface and crimped, is suitable particularly for a case where the outer edge of the flange part is located closer to any corner on the internal surface side rear case upper surface.

In the in-vehicle camera rear case configured as above, the side surface boss may be provided on the flange reception surface, the flange part may include a cut-out part, and the side surface boss may be engaged with the cut-out part and crimped.

In the above configuration, since the flange part includes the cut-out part, the flange part can be arranged on the recessed flange reception surface. Therefore, the dimension in the height direction, which is a direction perpendicular to the rear case upper surface, can be reduced.

In the in-vehicle camera rear case configured as above, the boss member on a shorter one out of the L1 and the L3, and on a shorter one out of the L2 and the L4 may be the side surface boss provided on the internal surface side rear case upper surface.

At the position on the shorter one out of the L1 and the L3, and on the shorter one out of the L2 and the L4, the internal surface side rear case upper surface may not have enough space to provide the boss member. However, with the above configuration, by providing the side surface boss even in a case where the internal surface side rear case upper surface does not have enough space to provide the boss member, the flange part of the shell can reliably be fixed to the rear case.

An in-vehicle camera case may be configured to have a space in which the in-vehicle camera is housed and which is formed by connecting the in-vehicle camera rear case configured as above to the front case.

With this configuration, in the in-vehicle camera case according to an aspect of the present invention, the connector module is fixed and connected to the rear case main body not by using a method that generates heat such as welding but by crimping the boss member, which projects from the rear case upper surface of the rear case main body, in a state where the boss member is engaged with the connector module. No heat is generated when fixing and connecting components by means of crimping. Hence, even when a part of the connector module is made of a resin, the part made of a resin will not be deformed or broken by heat. Accordingly, the occurrence frequency of defective products at the time of manufacturing in-vehicle camera cases can be reduced.

Also, in the method that utilizes crimping, pressure is applied to the rear case upper surface provided with the boss member. In the in-vehicle camera case according to an aspect of the present invention, since the crimping reception part is provided at the position, opposed to the boss member, on the surface of the rear case upper surface, the crimping reception part can receive pressure applied to the rear case upper surface at the time of crimping. Therefore, even in a case where the connector module is fixed and connected to the rear case main body by means of crimping, the structural strength of the in-vehicle camera case can be maintained.

According to an aspect of the present invention, there can be provided an in-vehicle camera case or in-vehicle camera rear case capable of reducing the occurrence frequency of defective products at the time of manufacture while maintaining the structural strength of the in-vehicle camera case or in-vehicle camera rear case.

BRIEF DESCRIPTION OF DRAWINGS

These and other characteristics, features, and advantages of an aspect of the present invention will become clear from the following description with reference to the accompanying drawings, wherein.

DESCRIPTION OF EMBODIMENTS

Hereinafter, an in-vehicle camera case 1 according to an embodiment of the present invention will be described with reference to FIGS. 1 to 9B. First, the configuration of the in-vehicle camera case 1 will be described.

Figure 1:
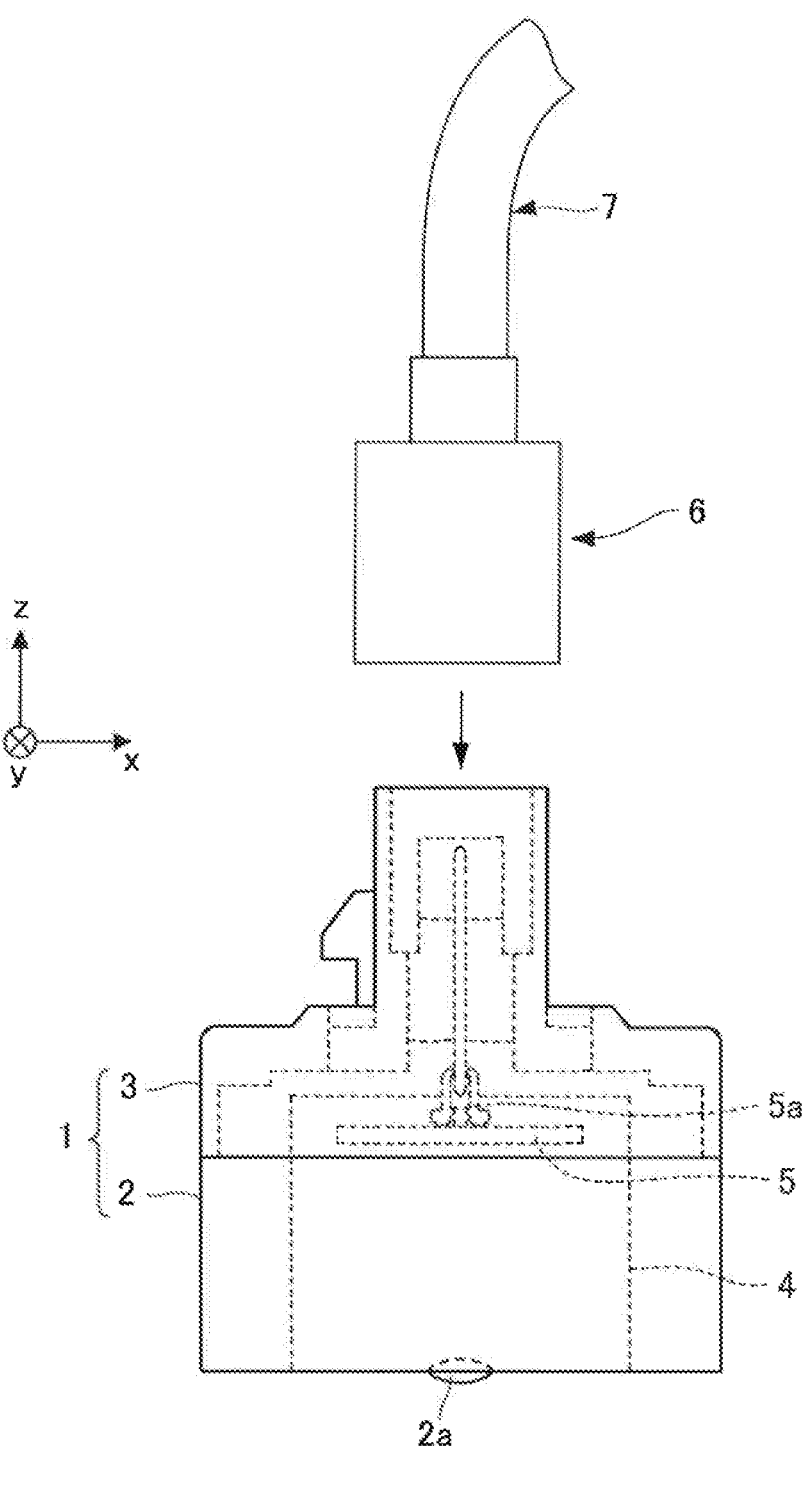
FIG. 1 is a schematic view illustrating an in-vehicle camera case according to a first embodiment of the present invention.

FIG. 1 is a schematic view illustrating the in-vehicle camera case 1 according to the present embodiment. In FIG. 1, the x direction is referred to as a lateral direction, the y direction is referred to as a depth direction, and the z direction is referred to as a height direction, and the same applies to FIGS. 2A and 2B and subsequent figures. In some cases, the positive z direction is referred to as an upper side or a connector side while the negative z direction is referred to as a lower side or a front case side.

(In-Vehicle Camera Case)

The in-vehicle camera case 1 includes a rear case 3 and a front case 2. The in-vehicle camera case 1 is formed as the rear case 3 and the front case 2 are connected to be opposed to each other and forms a space in which an in-vehicle camera 4 to be described later is housed. The rear case 3 and the front case 2 are connected, for example, by an adhesive, but may be connected by another mechanical method or a method such as welding. The in-vehicle camera case 1 constitutes an in-vehicle camera case according to the embodiment of the present invention. The front case 2 constitutes a front case according to the embodiment of the present invention. The rear case 3 constitutes an in-vehicle camera rear case according to the embodiment of the present invention.

As illustrated in FIG. 1, in the in-vehicle camera case 1, an external connector 6 including a cable 7 and the rear case 3 are connected to each other. As a result, this connection enables an in-vehicle camera substrate 5 described below and the external connector 6 to be electrically connected via a connector module 40 described below.

In the housing space inside the in-vehicle camera case 1, the in-vehicle camera 4 is installed. The in-vehicle camera 4 captures an image of the outside of the in-vehicle camera case 1 through a lens hole 2a of the front case 2. The in-vehicle camera 4 includes the in-vehicle camera substrate 5.

The in-vehicle camera substrate 5 is, for example, a printed circuit board (PCB) and is included in the in-vehicle camera 4. On the in-vehicle camera substrate 5, a not-illustrated imaging device such as a CCD and a CMOS is mounted. The in-vehicle camera substrate 5 includes a substrate connector 5a. The substrate connector 5a is brought into contact with the connector module 40 to be described later, and the connector module 40 is brought into contact with the external connector 6. As a result, the in-vehicle camera substrate 5 is electrically connected to the external connector 6.

(Rear Case)

Figure 2A:
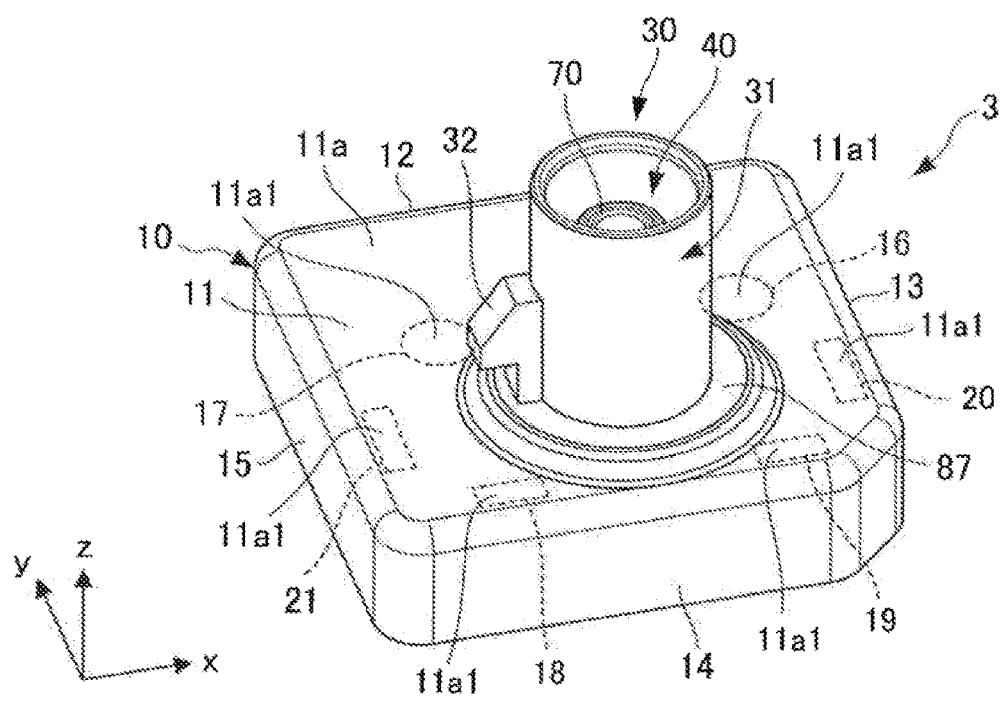
FIG. 2A is a perspective view illustrating a rear case according to the first embodiment of the present invention as viewed from the upper side.
Figure 2B:
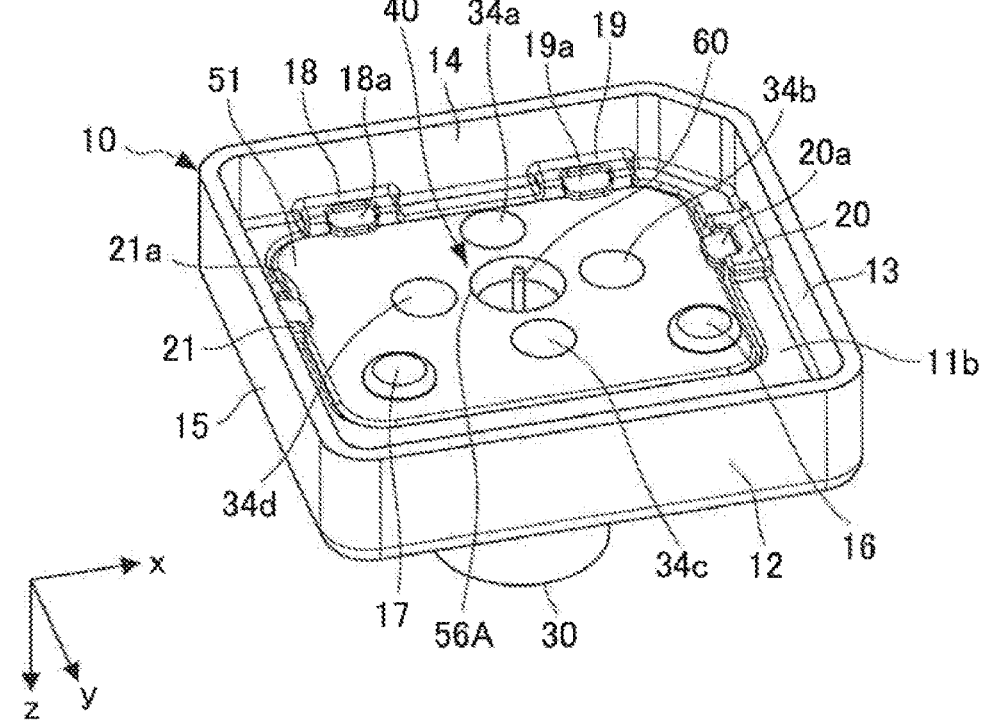
FIG. 2B is a perspective view illustrating the rear case according to the first embodiment of the present invention as viewed from the lower side.
Figure 3:
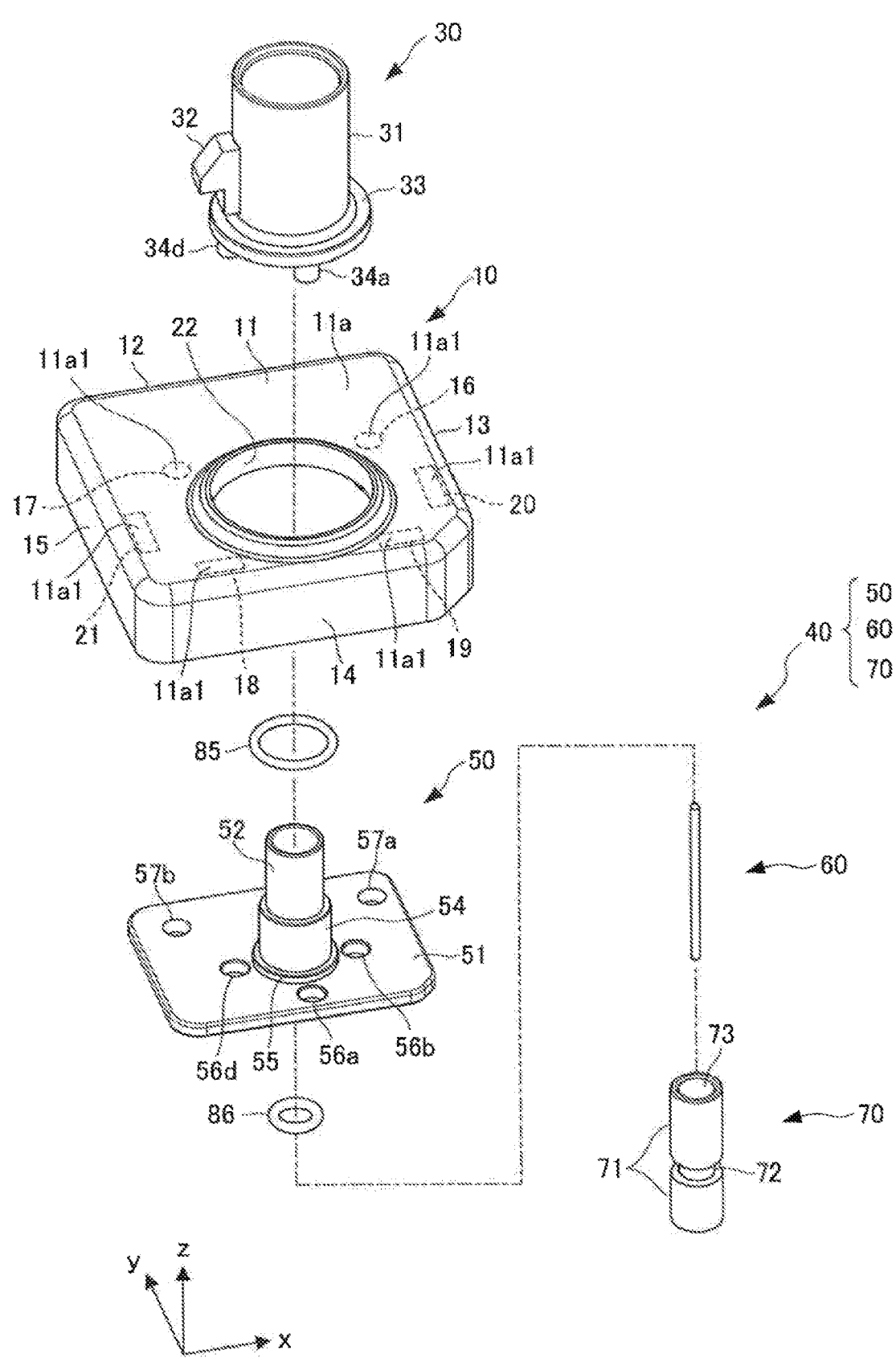
FIG. 3 is an exploded perspective view of the rear case according to the first embodiment of the present invention.
Figure 4:
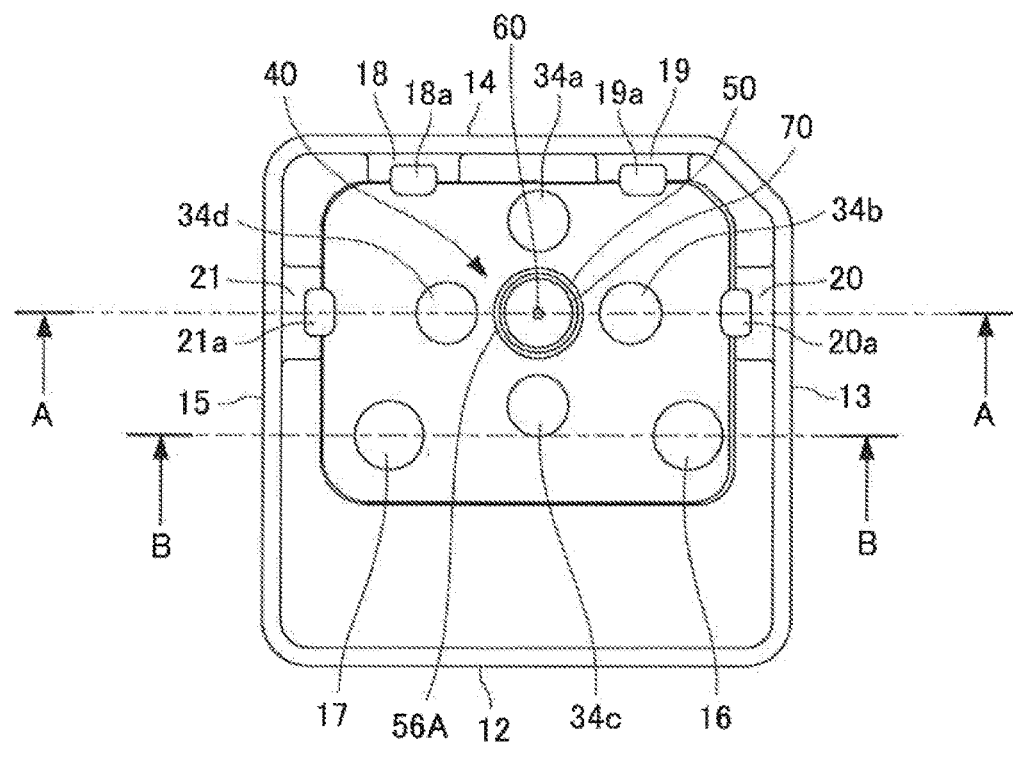
FIG. 4 is a bottom view of the rear case according to the first embodiment of the present invention.
Figure 5A:
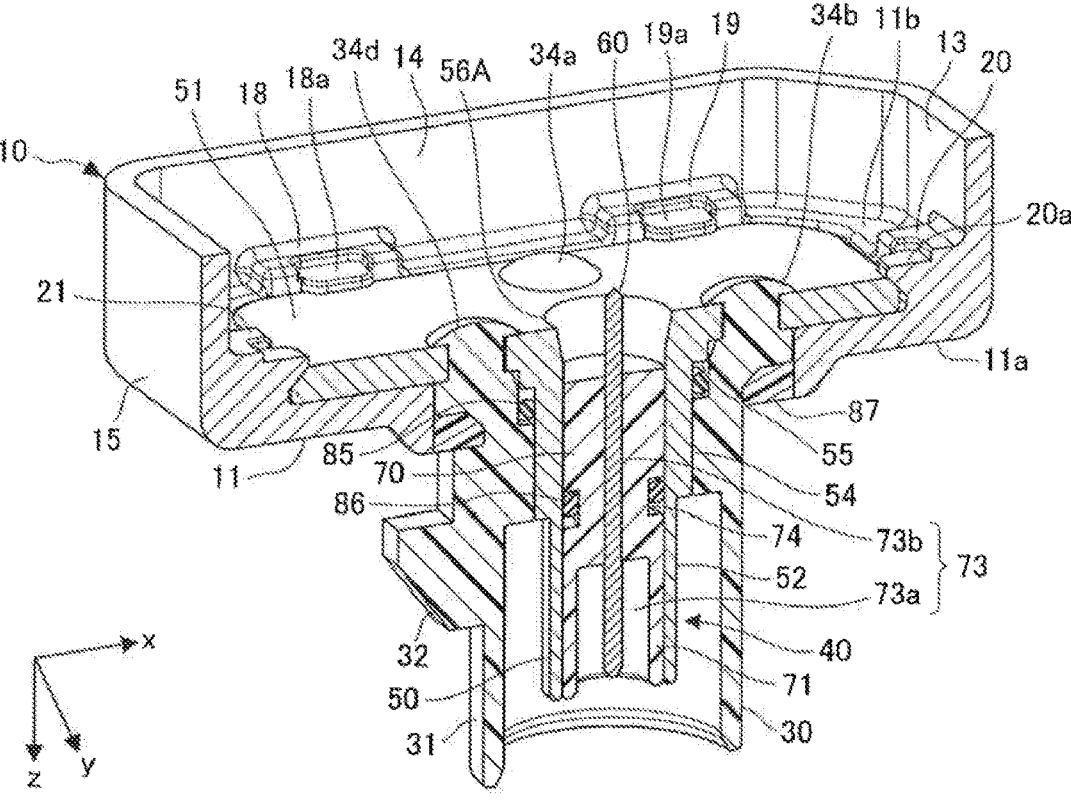
FIG. 5A is a cross-sectional view of the rear case according to the first embodiment of the present invention, taken along line A-A in FIG. 4.
Figure 5B:
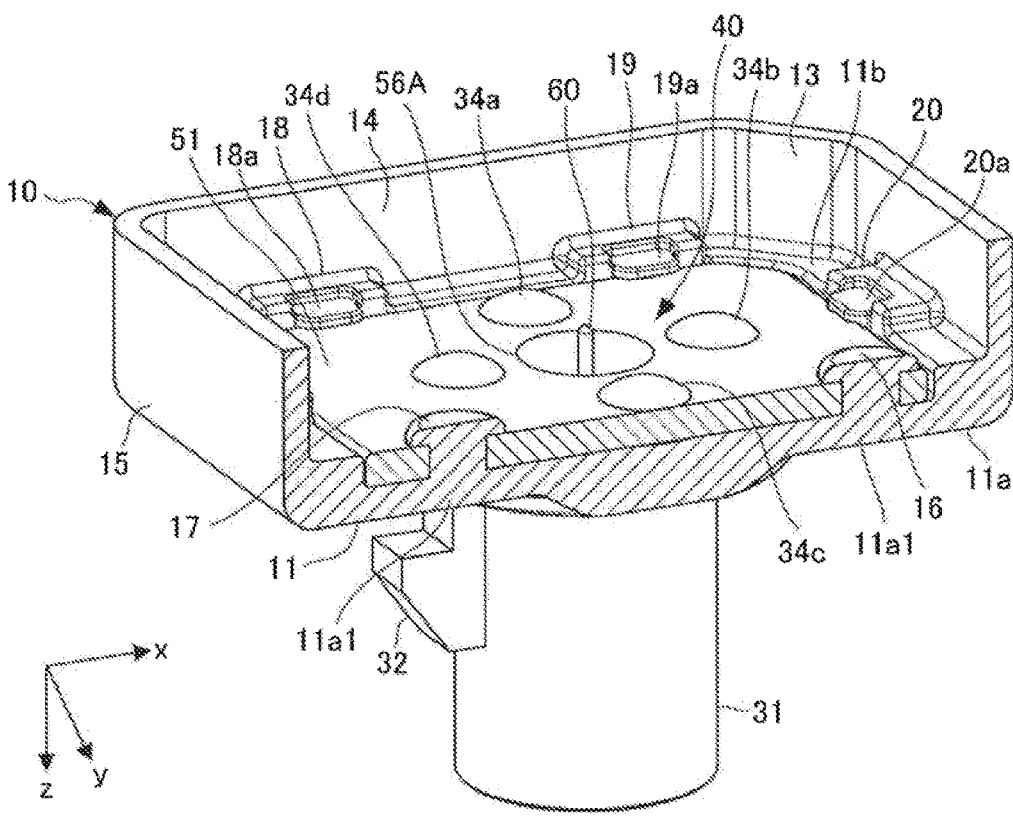
FIG. 5B is a cross-sectional view of the rear case according to the first embodiment of the present invention, taken along line B-B in FIG. 4.

FIGS. 2A and 2B illustrate the entirety of the rear case 3, in which FIG. 2A is a perspective view as viewed from the upper side, and FIG. 2B is a perspective view as viewed from the lower side. FIG. 3 is an exploded perspective view of the rear case 3. FIG. 4 is a bottom view of the rear case 3. FIG. 5A is a cross-sectional view of the rear case 3 taken along line A-A in FIG. 4, and FIG. 5B is a cross-sectional view taken along line B-B.

The rear case 3 includes a rear case main body 10, the connector module 40, and a housing 30. As illustrated in FIGS. 2A and 2B, the cylindrical housing 30 projects from the upper surface of the rear case main body 10 and houses the connector module 40. Also, as illustrated in FIGS. 5A and 5B, the connector module 40 is engaged with the rear case main body 10 and with the housing 30. The rear case 3 is connected to the external connector 6 and to the in-vehicle camera substrate 5, enabling electrical connection between the external connector 6 and the in-vehicle camera substrate 5.

(Rear Case Main Body)

Figure 6A:
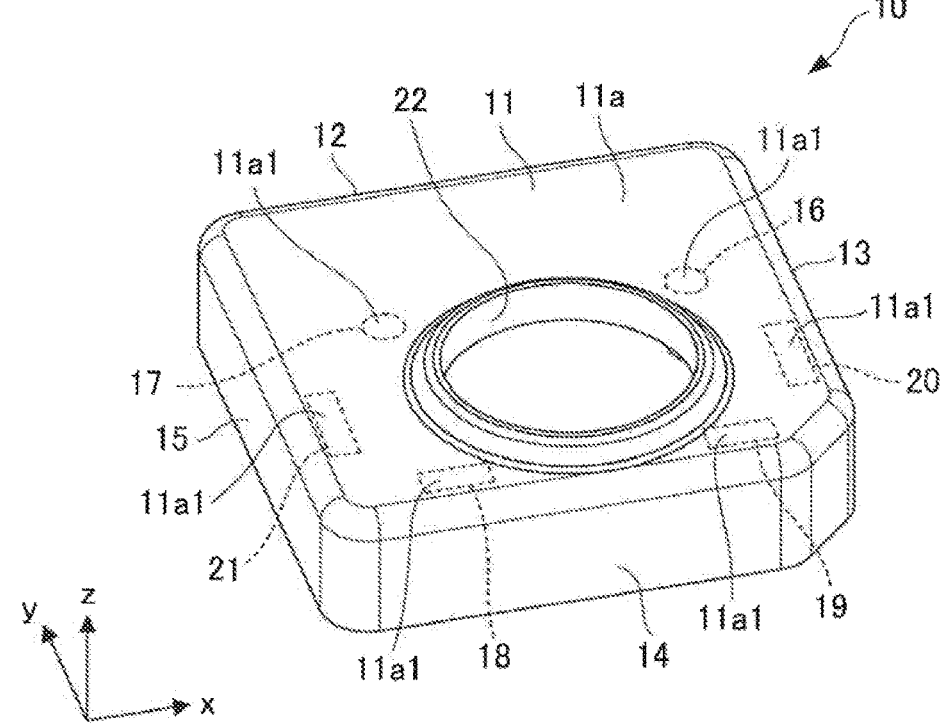
FIG. 6A is a perspective view illustrating a rear case main body according to the first embodiment of the present invention as viewed from the upper side.
Figure 6B:
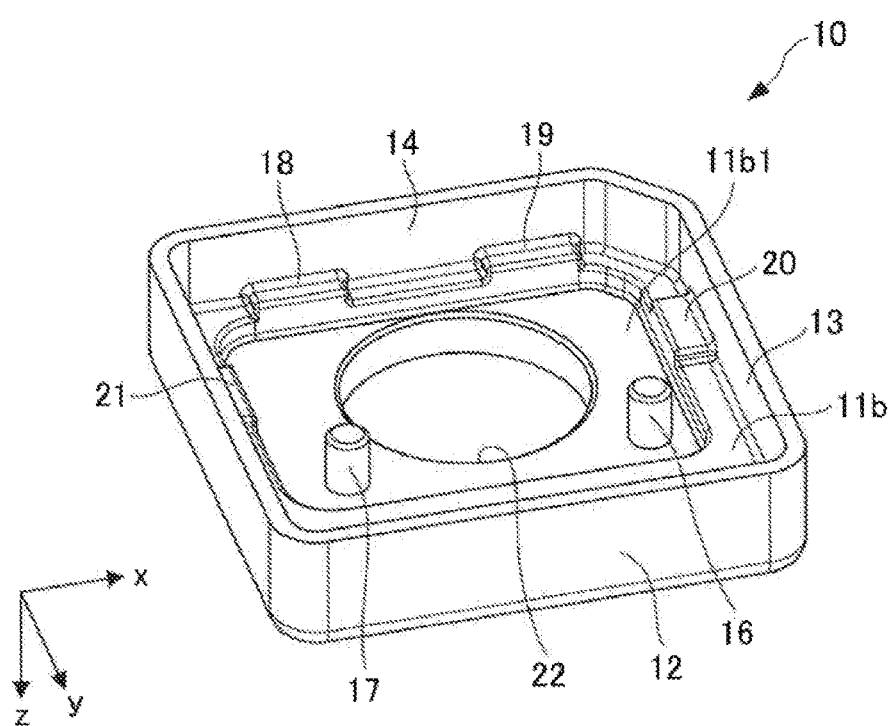
FIG. 6B is a perspective view illustrating the rear case main body according to the first embodiment of the present invention as viewed from the lower side.
Figure 7:
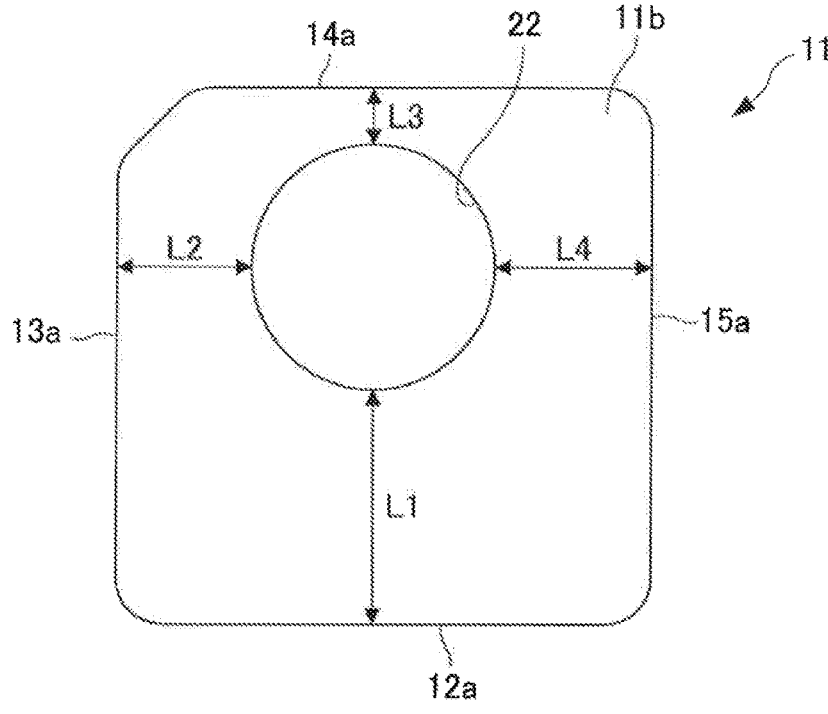
FIG. 7 is a schematic view describing the position of an insertion hole of the rear case main body according to the first embodiment of the present invention.

FIGS. 6A and 6B illustrate the rear case main body 10, in which FIG. 6A is a perspective view as viewed from the upper side, and FIG. 6B is a perspective view as viewed from the lower side. FIG. 7 is a schematic view describing the position of an insertion hole of the rear case main body 10.

The rear case main body 10 is connected to the front case 2 in an opposed manner to form a space in which the in-vehicle camera 4 is housed. The rear case main body 10 is a box-shaped case provided with an insertion hole 22 and opened at one surface. The rear case main body 10 is made of, for example, aluminum, but may be made of another metal such as copper. The box-shaped rear case main body 10 is similar to a rectangular solid in shape with one surface in the negative z direction, that is, the lower surface in FIG. 6A, opened.

(Rear Case Upper Surface and Read Case Side Surface)

As illustrated in FIGS. 6A and 6B, the rear case main body 10 includes a rear case upper surface 11 on the upper side and four rear case side surfaces 12, 13, 14, and 15 on the lateral sides. The rear case upper surface 11 constitutes a rear case upper surface according to the embodiment of the present invention. The rear case side surfaces 12, 13, 14, and 15 constitute rear case side surfaces according to the embodiment of the present invention.

The surface opposed to the rear case upper surface 11 is opened. The upper surface of the rear case upper surface 11 is an external surface side rear case upper surface 11a, and the lower surface thereof is an internal surface side rear case upper surface 11b. In the rear case upper surface 11, the internal surface side rear case upper surface 11b on the inner side is opposed to the front case 2 in the z direction.

As illustrated in FIG. 6B, the internal surface side rear case upper surface 11b is provided with a flange reception surface 11b1 and side surface bosses 18, 19, 20, and 21. The flange reception surface 11b1 is provided as a recess that receives a flange part 51, which will be described later, on the surface of the internal surface side rear case upper surface 11b of the rear case upper surface 11. The flange reception surface 11b1 is provided with the insertion hole 22 and flange reception surface bosses 16 and 17 engaged with the connector module 40, which will be described below. Note that the internal surface side rear case upper surface 11b defined in the present embodiment conceptually encompasses the flange reception surface 11b1. Therefore, for example, "on the flange reception surface 11b1" also means "on the internal surface side rear case upper surface 11b".
(Boss Member)

As illustrated in FIG. 6B, the flange reception surface bosses 16 and 17 are boss members that project in the vertical direction from the rear case upper surface 11 toward the internal surface side of the rear case main body 10 and are provided on the internal surface side rear case upper surface 11b, which is a surface of the rear case upper surface 11 on the internal surface side to be engaged with the connector module 40. The flange reception surface bosses 16 and 17 constitute a boss member according to the embodiment of the present invention.

The flange reception surface bosses 16 and 17 are crimped in a state of being engaged with the connector module 40. As a result, the connector module 40 is reliably fixed and connected to the rear case main body 10. Crimping is performed, for example, by pressing the flange reception surface bosses 16 and 17 in the upper direction, that is, in the positive z direction, in a state of engaging the flange reception surface bosses 16 and 17 with the connector module 40 with use of a crimping device or the like.

While FIG. 6B illustrates states of the flange reception surface bosses 16 and 17 before being crimped, FIGS. 2B and 5B illustrate states of the flange reception surface bosses 16 and 17 after being crimped. In the states after being crimped, the diameters of the tops of the flange reception surface bosses 16 and 17 are increased as a result of crimping.

In the present embodiment, although two flange reception surface bosses 16 and 17 are provided as the flange reception surface boss, the number of the flange reception surface bosses is not limited to this, and the arranged positions may be changed according to the shape or the like of the flange part 51.

The side surface bosses 18 and 19 are each provided on the internal surface side rear case upper surface 11b and closer to the rear case side surface 14. That is, the side surface bosses 18 and 19 are provided on the internal surface side rear case upper surface 11b along the rear case side surface 14, which is a side surface corresponding to the shorter one out of L1 and L3 described below. The side surface bosses 18 and 19 are formed to extend from the rear case side surface 14. The side surface bosses 18 and 19 are boss members to be crimped in a state where the flange part 51 to be described later is engaged with the flange reception surface 11b1 to engage the rear case main body 10 with the connector module 40. The side surface bosses 18 and 19 constitute the boss member according to the embodiment of the present invention.

While FIG. 6B illustrates states of the side surface bosses 18 and 19 before being crimped, FIGS. 2B and 5B illustrate states of the side surface bosses 18 and 19 after being crimped. In the states after being crimped, deformed parts 18a and 19a are formed which are deformed after parts of the side surface bosses 18 and 19 are crimped.

The side surface boss 20 is provided on the internal surface side rear case upper surface 11b and closer to the rear case side surface 13. The side surface boss 20 is formed to extend from the rear case side surface 13. The side surface boss 20 is a boss member to be crimped in a state where the flange part 51 to be described later is engaged with the flange reception surface 11b1 to engage the rear case main body 10 with the connector module 40. The side surface boss 20 constitutes the boss member according to the embodiment of the present invention.

While FIG. 6B illustrates a state of the side surface boss 20 before being crimped, FIGS. 2B and 5B illustrate a state of the side surface boss 20 after being crimped. In the state after being crimped, a deformed part 20a is formed which is deformed after a part of the side surface boss 20 is crimped.

The side surface boss 21 is provided on the internal surface side rear case upper surface 11b and closer to the rear case side surface 15. The side surface boss 21 is formed to extend from the rear case side surface 15. The side surface boss 21 is a boss member to be crimped in a state where the flange part 51 to be described later is engaged with the flange reception surface 11b1 to engage the rear case main body 10 with the connector module 40. The side surface boss 21 constitutes the boss member according to the embodiment of the present invention.

While FIG. 6B illustrates a state of the side surface boss 21 before being crimped, FIGS. 2B and 5B illustrate a state of the side surface boss 21 after being crimped. In the state after being crimped, a deformed part 21a is formed which is deformed after a part of the side surface boss 21 is crimped.

As described above, by providing the side surface bosses 18, 19, 20, and 21 to extend from both the internal surface side rear case upper surface 11b and the rear case side surfaces 13, 14, and 15, the flange part 51 of a shell 50 can be fixed to the rear case 3 more firmly than in a case of providing the side surface bosses 18, 19, 20, and 21 to extend only from the internal surface side rear case upper surface 11b. The reason for this is that, in a case where the shell 50 receives a load in a direction perpendicular to the internal surface side rear case upper surface 11b, the load that the side surface bosses 18, 19, 20, and 21 have received can be applied to not only the connection portions to the internal surface side rear case upper surface 11b but also the connection portions to the rear case side surfaces 13, 14, and 15. In other words, the reason is that the load can be distributed in different directions.

In the present embodiment, although four side surface bosses 18, 19, 20, and 21 are provided as the side surface boss, the number of the side surface bosses is not limited to this, and the arranged positions may appropriately be changed.

The rear case side surfaces 12, 13, 14, and 15, which are four side surfaces of the rear case 3, are provided perpendicularly along the outer periphery of the rear case upper surface 11 in the lower direction or in the negative z direction.

As illustrated in FIG. 6A, crimping reception surfaces 11al are provided around the insertion hole 22 of the external surface side rear case upper surface 11a. As illustrated in FIG. 5B, the crimping reception surfaces 11al are provided on the surface, opposed to the flange reception surface bosses 16 and 17, of the external surface side rear case upper surface 11a, which is a surface of the rear case upper surface 11 on the external surface side of the rear case main body 10.
(Crimping Reception Part)

In general, at the time of fixing by means of crimping, pressure is applied to a boss member or the like. Hence, a load may be applied to a case in terms of affecting its strength. However, in the rear case 3 according to the present embodiment, the crimping reception surfaces 11al are provided at positions, opposed to the flange reception surface bosses 16 and 17 and the side surface bosses 18, 19, 20, and 21 serving as the boss members, on the external surface side rear case upper surface 11a, which is a surface of the rear case upper surface 11 on the external surface side of the rear case main body 10. Thus, the crimping reception surfaces 11*al* can receive pressure applied to the rear case upper surface 11 at the time of crimping. Therefore, even in a case where the connector module 40 is fixed and connected to the rear case main body 10 by means of crimping, the structural strength of the rear case 3 can be maintained. The crimping reception surfaces 11*al* constitute a crimping reception part according to the embodiment of the present invention.

As illustrated in FIG. 7, the insertion hole 22 is formed at a position displaced from the center of the rear case upper surface 11 in the negative y direction. The degree of displacement from the center of the rear case upper surface 11 to the insertion hole 22 will be described below.

FIG. 7 illustrates the internal surface side rear case upper surface 11*b* when the rear case upper surface 11 is viewed from the negative z direction. The side of the internal surface side rear case upper surface 11*b* corresponding to the rear case side surface 12 is referred to as a side 12*a*, the side corresponding to the rear case side surface 13 is referred to as a side 13*a*, the side corresponding to the rear case side surface 14 is referred to as a side 14*a*, and the side corresponding to the rear case side surface 15 is referred to as a side 15*a*. At this time, the sides 12*a*, 13*a*, 14*a*, and 15*a* are four sides serving as the outer periphery of the internal surface side rear case upper surface 11*b*. The side 12*a* and the side 14*a* are opposed to each other, and the side 13*a* and the side 15*a* are opposed to each other.

The closest distance from the outer edge of the insertion hole 22 to the side 12*a* is referred to as L1, the closest distance to the side 13*a* is referred to as L2, the closest distance to the side 14*a* is referred to as L3, and the closest distance to the side 15*a* is referred to as L4. In this case, in the present embodiment, L1>L3 is satisfied, and the position of the insertion hole 22 is displaced from the center of the internal surface side rear case upper surface 11*b* so that L1 and L3 have different values.

Forming the insertion hole 22 at a position displaced from the center of the internal surface side rear case upper surface 11*b* toward the side 12*a* or the side 14*a* in this manner can deal with a case where the in-vehicle camera substrate 5 inside the in-vehicle camera case 1 to be connected to the connector module 40 is arranged at a position opposed to the position displaced from the center of the internal surface side rear case upper surface 11*b* toward the side 12*a* or the side 14*a*.

(Connector Module)

The connector module 40 is at least partially made of a resin, and electrically connects the external connector 6 to the in-vehicle camera substrate 5. The connector module 40 is inserted in the insertion hole 22, and is engaged with the rear case main body 10 and with the housing 30 to be described later. Furthermore, the connector module 40 projects out of the rear case main body 10 to be fitted to the external connector 6. Specifically, the members made of a resin are the housing 30, an insulator 70, a shell O ring 85, and an insulator O ring 86, which will be described below. In a state where the connector module 40 is engaged with the flange reception surface bosses 16 and 17, the flange reception surface bosses 16 and 17 are crimped, whereby the connector module 40 is fixed and connected to the rear case main body 10. The connector module 40 includes the shell 50, a terminal 60, and the insulator 70. The connector module 40 constitutes a connector module according to the embodiment of the present invention.

(Shell)

Figure 8A:
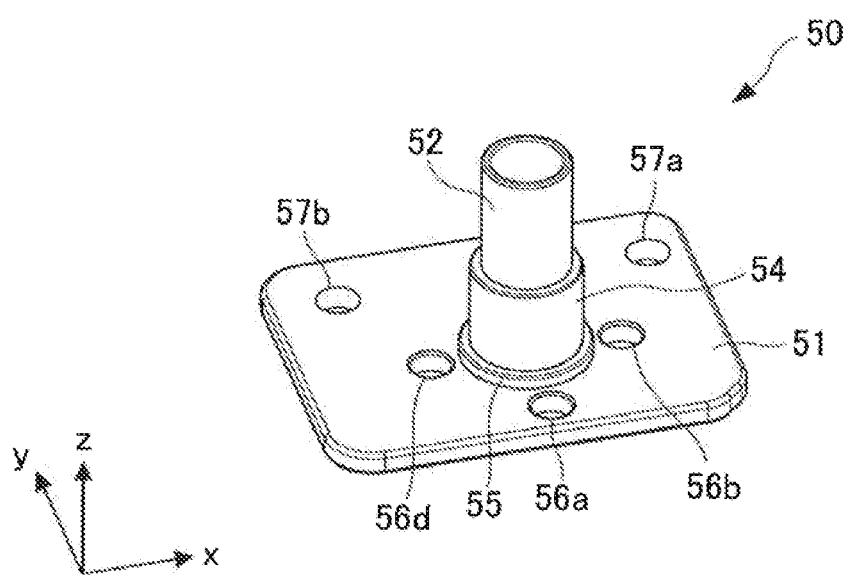
FIG. 8A is a perspective view illustrating a shell according to the first embodiment of the present invention as viewed from the upper side.
Figure 8B:
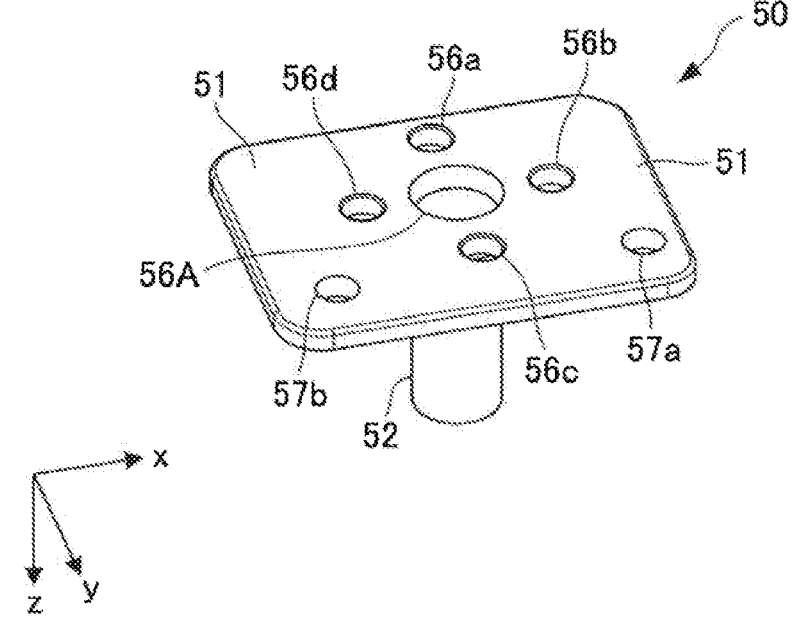
FIG. 8B is a perspective view illustrating the shell according to the first embodiment of the present invention as viewed from the lower side.

FIGS. 8A and 8B illustrate the shell 50 according to the present embodiment, in which FIG. 8A is a perspective view as viewed from the upper side, and FIG. 8B is a perspective view as viewed from the lower side. The shell 50 is a conductor that is made of metal such as die-cast zinc and that includes a cylindrical portion. The shell 50 includes the flange part 51, an upper shell 52, a lower shell 54, a shell flange 55, and the shell O ring 85. The shell 50 constitutes a shell according to the embodiment of the present invention.

The flange part 51 is a flat plate-like member that is provided with a central penetration hole 56A, and housing boss holes 56*a*, 56*b*, 56*c*, and 56*d* and rear case boss holes 57*a* and 57*b* serving as a plurality of engagement holes and that is engaged with the rear case main body 10 and with the housing 30. When the flange part 51 is engaged with the flange reception surface bosses 16 and 17 of the rear case main body 10, the flange reception surface bosses 16 and 17 penetrate the rear case boss holes 57*a* and 57*b*, respectively. The central penetration hole 56A is provided so that a terminal 60 to be described later in the shell 50 penetrates the central penetration hole 56A to be able to come in contact with and become conductive to the in-vehicle camera substrate 5. In the present embodiment, although four housing boss holes and two rear case boss holes are formed, the number of boss holes is not limited to this, and the arrangement of the boss holes may differ from the arrangement illustrated in FIGS. 8A and 8B.

The cylindrical portion of the shell 50 is constituted by the upper shell 52, the lower shell 54, and the shell flange 55 in this order from the upper side along the z direction. The cylindrical portion of the shell 50 houses therein and fixes the insulator 70 to be described later. The upper shell 52 is located on the uppermost side of the cylindrical portion of the shell 50. The upper shell 52, as well as the housing 30, is fitted with the external connector 6.

The upper shell 52 houses therein the insulator 70 as illustrated in FIG. 5A. The lower shell 54 houses therein the insulator 70. The lower shell 54 is the cylindrical portion of the shell 50 that continues below the upper shell 52 and is formed to have a larger diameter than that of the upper shell 52.

The shell flange 55 is a portion that continues below the lower shell 54 and also continues above the flange part 51. The shell flange 55 has a larger outside diameter than that of the lower shell 54. As illustrated in FIG. 5A, the shell flange 55 is configured to enable the shell O ring 85 for waterproofing to be fitted between the shell flange 85 and the internal surface of the housing 30 to be described later. The shell O ring 85 is made of, for example, a resin such as ethylene-propylene rubber. By providing the shell O ring 85, it is possible to prevent water from flowing from the external connector side into the in-vehicle camera rear case.

(Terminal)

The terminal 60 illustrated in FIG. 3 is arranged along the central axis inside the shell 50 and is electrically conductive from one end to the other end thereof. That is, the one end side of the terminal 60 on the side in the positive z direction is configured to come into contact with the external connector 6 while the other end side thereof on the side in the negative z direction is configured to come into contact with the substrate connector 5*a* of the in-vehicle camera substrate 5 to achieve electrical connection. The terminal 60 is made of, for example, a copper alloy, and may be made of another metal. The terminal 60 constitutes a terminal according to the embodiment of the present invention. The terminal 60 is held by the insulator 70 to be described later, for example, by a method of being engaged with a not-illustrated engagement part.

(Insulator)

The insulator 70 illustrated in FIG. 3 is an insulating member that is provided between the shell 50 and the terminal 60 and holds the terminal 60. The insulator 70 is constituted by a body part 71 and an O ring groove part 72. The insulator 70 is made of, for example, a resin such as a polyamide. The insulator 70 constitutes an insulator according to the embodiment of the present invention.

At the center of the insulator 70, a terminal penetration hole 73 passing along the z direction is formed. The terminal 60 extends inside the terminal penetration hole 73. The terminal penetration hole 73 includes a penetration hole 73a that is provided on the upper side and has a larger diameter and a penetration hole 73b that is provided on the lower side and has a smaller diameter. The penetration hole 73a can be fitted to the external connector 6. The penetration hole 73b has a substantially equal outside diameter to that of the terminal 60 and functions as a hole that holds the terminal 60. The insulator 70 holds the terminal 60, for example, by a method of configuring the terminal 60 to be engaged with a not-illustrated engagement part. The insulator 70 is fixed to the shell 50 at the outside. As a result, the positional relationship with the other components of the connector module 40 is fixed.

The body part 71 is a cylindrical member constituting the insulator 70. In the internal space of the body part 71, the terminal 60 extends along the up-down direction (z direction). The body part 71 is arranged in the housing space of the housing 30 to be described later and is fitted to the external connector 6.

The O ring groove part 72 is a groove-like portion located near the center of the body part 71 in the height direction and has a smaller outside diameter than that of the body part 71. The O ring groove part 72 is a groove for the insulator O ring 86 to be inserted therein.

The insulator O ring 86 is made of, for example, a resin such as ethylene-propylene rubber. By providing the insulator O ring 86, it is possible to prevent water from flowing from the external connector side into the in-vehicle camera rear case.

(Housing)

Figure 9A:
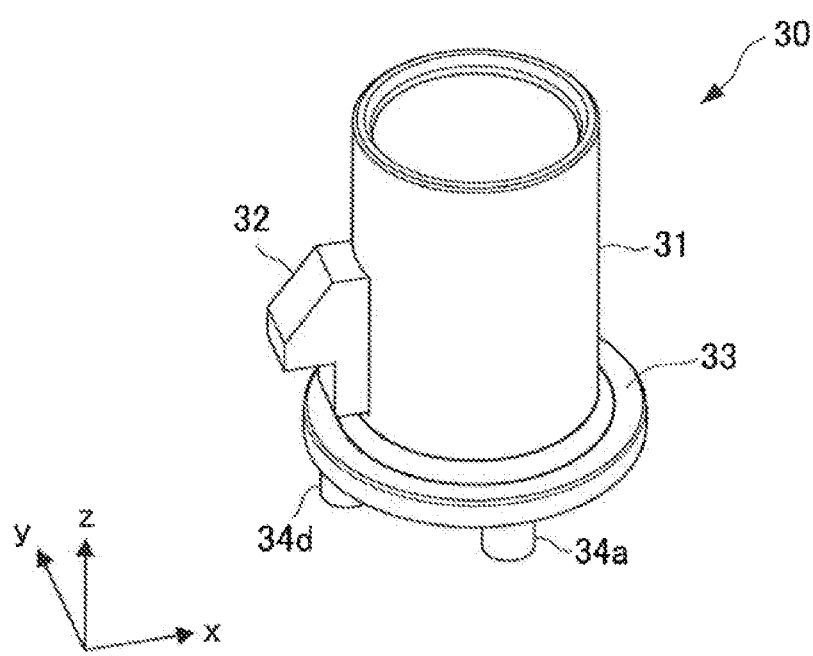
FIG. 9A is a perspective view illustrating a housing according to the first embodiment of the present invention as viewed from the upper side.
Figure 9B:
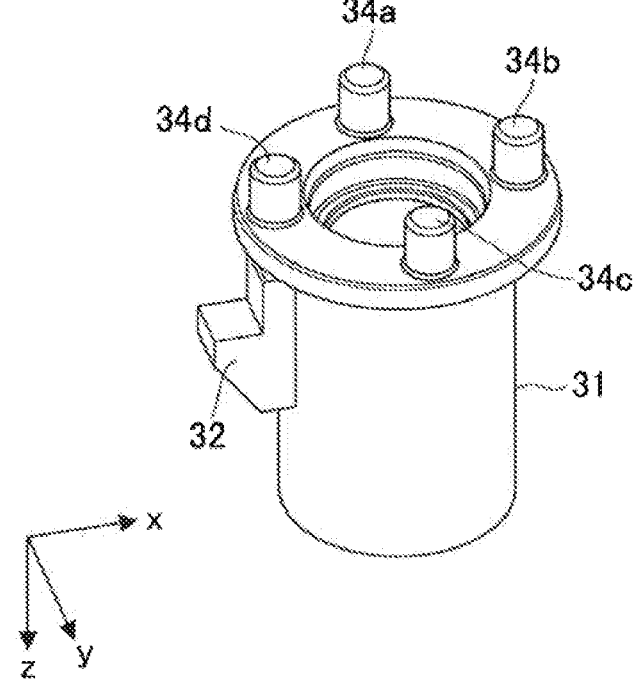
FIG. 9B is a perspective view illustrating the housing according to the first embodiment of the present invention as viewed from the lower side.

FIGS. 9A and 9B illustrate the housing 30 according to the present embodiment, in which FIG. 9A is a perspective view as viewed from the upper side, and FIG. 9B is a perspective view as viewed from the lower side. The housing 30 is engaged with the connector module 40, houses the connector module 40, and is fitted to the external connector 6. The housing 30 includes a cylindrical part 31, a lock part 32, a housing flange 33, and flange bosses 34a, 34b, 34c, and 34d. The housing 30 is made of, for example, a resin such as a polyamide. The housing 30 constitutes a housing according to the embodiment of the present invention.

The cylindrical part 31 houses, in the internal housing space thereof, the connector module 40 and is fitted to the external connector 6. On the side surface of the cylindrical part 31, one lock part 32 is provided to project. The lock part 32 is engaged with a not-illustrated engagement part of the external connector 6 to enable the positional relationship between the housing 30 and the external connector 6 to be fixed.

The housing flange 33 is a disk-like member that continues below the cylindrical part 31 and has a larger outside diameter than that of the cylindrical part 31. The housing flange 33 is fitted to the insertion hole 22 of the rear case 3.

In the space between the housing flange 33 and the rear case 3 formed when the housing flange 33 is fitted to the insertion hole 22, an adhesive 87 is inserted. In the present embodiment, an elastic adhesive that is cured with moisture is used as the adhesive 87, but another type of adhesive may be used. By using the adhesive 87, the positional relationship between the housing 30 and the rear case 3 can be fixed.

On the lower surface of the housing flange 33, the flange bosses 34a, 34b, 34c, and 34d are provided. In the present embodiment, although four flange bosses are provided, the number of the flange bosses is not limited to this and may be different number. The flange boss 34a is crimped in the positive z direction in a state of being engaged with the housing boss hole 56a of the shell 50. Similarly, the flange boss 34b is crimped in the positive z direction in a state of being engaged with the housing boss hole 56b of the shell 50, the flange boss 34c is crimped in the positive z direction in a state of being engaged with the housing boss hole 56c of the shell 50, and the flange boss 34d is crimped in the positive z direction in a state of being engaged with the housing boss hole 56d of the shell 50. In this manner, the flange bosses 34a, 34b, 34c, and 34d are crimped to fix the housing 30 to the shell 50 as illustrated in FIGS. 2B and 5A.

(Manufacturing Method)

Referring to FIG. 3, the manufacturing procedure of the rear case 3 will be described.

(1) The terminal 60 is inserted into the insulator 70, and the terminal 60 is held by the insulator 70.

(2) Subsequently, the insulator O ring 86 is inserted into the O ring groove 72 of the insulator 70.

(3) Subsequently, the insulator 70 is inserted into the central penetration hole 56A of the shell 50 from the lower side and is fixed.

(4) Subsequently, the shell O ring 85 is attached to the shell 50, whereby the connector module 40 is completed.

(5) Subsequently, the connector module 40 is inserted into the insertion hole 22 of the rear case main body 10 from the lower side and is fixed by means of crimping.

(6) Subsequently, the housing 30 is engaged with the connector module 40 from the upper side and is fixed by means of crimping.

(7) Finally, the adhesive 87 is applied between the housing 30 and the rear case main body 10 and is cured for fixing them.

As described above, in the in-vehicle camera case 1 according to the present embodiment, the rear case 3 is connected to the front case 2 to form a space in which the in-vehicle camera 4 is housed.

The rear case 3 according to the present embodiment includes: the rear case main body 10 that is connected to the front case 2 in an opposed manner to form a space in which the in-vehicle camera 4 is housed, is provided with the insertion hole 22, is opened at one surface, and has a box shape; the connector module 40 that electrically connects the external connector 6 to the in-vehicle camera substrate 5, is inserted in the insertion hole 22, and is engaged with the rear case main body 10, and at least a part of which projecting out of the rear case main body 10 and fitted to the external connector 6 is made of a resin; and the housing 30 that is engaged with the connector module 40, houses the connector module 40, and is fitted to the external connector 6. The rear case main body 10 includes: the rear case upper surface 11 opposed to the front case 2; the plurality of rear case side surfaces 12, 13, 14, and 15 provided perpendicularly along the outer periphery of the rear case upper surface 11; the flange reception surface bosses 16 and 17 that projects in the vertical direction from the rear case upper surface 11 toward the internal surface side of the rear case main body 10 and is provided on the internal surface side rear case upper surface 11b of the rear case upper surface 11 on the internal surface side to be engaged with the connector module 40; and the crimping reception surfaces 11a1 provided at positions, opposed to the flange reception surface bosses 16 and 17 and the side surface bosses 18, 19, 20, and 21, on the external surface side rear case upper surface 11a of the rear case upper surface 11, which is on the external surface side of the rear case main body 10. The flange reception surface bosses 16 and 17 are crimped in a state of being engaged with the connector module 40.

Also, the connector module 40 includes: the shell 50 that serves as a conductor made of metal and includes a cylindrical portion; the terminal 60 arranged along the central axis inside the shell 50 and being conductive by coming in contact with the external connector 6 at the one end side thereof and coming in contact with the substrate connector 5a of the in-vehicle camera substrate 5 at the other end side thereof; and the insulator 70 that is provided between the shell 50 and the terminal 60, holds the terminal 60, and has an insulation property.

Also, the shell 50 further includes the flange part 51 that is provided with the rear case boss holes 57a and 57b and the housing boss holes 56a, 56b, 56c, and 56d, is engaged with the rear case main body 10 and the housing 30, and has a flat plate shape. When the flange part 51 is engaged with the flange reception surface bosses 16 and 17 of the rear case main body 10, the flange reception surface bosses 16 and 17 penetrate the rear case boss holes 57a and 57b.

Also, the shell 50 includes the shell flange 55 having a larger outside diameter and the shell O ring 85 for waterproofing to be fitted between the shell flange 55 and the internal surface of the housing 30.

Also, the rear case main body 10 is provided with the flange reception surface 11b1, which is formed as a recess for receiving the flange part 51, on the internal surface side rear case upper surface 11b of the rear case upper surface 11 on the internal surface side, and the flange reception surface bosses 16 and 17 are provided on the flange reception surface 11b1.

Also, the four sides serving as the outer periphery of the rear case upper surface 11 are referred to as the side 12a, the side 13a, the side 14a, and the side 15a. The side 12a and the side 14a are opposed to each other. The side 13a and the side 15a are opposed to each other. The closest distance from the outer edge of the insertion hole 22 to the side 12a is referred to as L1, the closest distance to the side 13a is referred to as L2, the closest distance to the side 14a is referred to as L3, and the closest distance to the side 15a is referred to as L4. In this case, L1>L3 is satisfied, and the position of the insertion hole 22 is displaced from the center of the rear case upper surface 11 so that L1 and L3 have different values.

Also, the boss members on the rear case side surface 14 corresponding to the shorter one out of L1 and L3 are the side surface bosses 18 and 19 provided on the internal surface side rear case upper surface 11b, and the side surface bosses 18 and 19 are crimped in a state where the flange part 51 is engaged with the flange reception surface 11b1.

Also, the side surface bosses 18 and 19 are formed to extend from the rear case side surface 14, the side surface boss 20 is formed to extend from the rear case side surface 13, and the side surface boss 21 is formed to extend from the rear case side surface 15.

With this configuration, in the in-vehicle camera case 1 according to the present embodiment, the connector module 40 is fixed and connected to the rear case main body 10 not by using a method that generates heat such as welding but by crimping the flange reception surface bosses 16 and 17, which project in the vertical direction from the rear case upper surface 11 of the rear case main body 10 toward the internal surface side, in a state where the flange reception surface bosses 16 and 17 are engaged with the connector module 40. No heat is generated when fixing and connecting components by means of crimping. Hence, even when a part of the connector module 40 is made of a resin, the part made of a resin will not be deformed or broken by heat. Accordingly, the occurrence frequency of defective products at the time of manufacture the rear cases 3 can be reduced.

Also, in the method that utilizes crimping, pressure is applied to the rear case upper surface 11 provided with the flange reception surface bosses 16 and 17. In the rear case 3, the crimping reception surfaces 11a1 are provided at the positions, opposed to the flange reception surface bosses 16 and 17 and the side surface bosses 18, 19, 20, and 21, on the external surface side rear case upper surface 11a of the rear case upper surface 11, which is on the external surface side of the rear case main body 10. As a result, the crimping reception surfaces 11a1 can receive pressure applied to the rear case upper surface 11 at the time of crimping. Therefore, even in a case where the connector module 40 is fixed and connected to the rear case main body 10 by means of crimping, the structural strength of the rear case 3 can be maintained.

Also, in the rear case 3 according to the present embodiment, the terminal 60 held by the insulator 70 inside the shell 50 comes in contact with the external connector 6 at the one end side thereof and comes in contact with the in-vehicle camera substrate 5 at the other end side thereof. Accordingly, it is possible to electrically connect the external connector 6 to the in-vehicle camera substrate 5 in an effective manner.

Also, in the rear case 3 according to the present embodiment, since the shell 50 includes the flat plate-like flange part 51 provided with the rear case boss holes 57a and 57b and the housing boss holes 56a, 56b, 56c, and 56d, the connector module 40 can be easily engaged with the rear case main body 10 and the housing 30.

Also, in the rear case 3 according to the present embodiment, since the shell O ring 85 for waterproofing is fitted between the shell flange 55 and the internal surface of the housing 30, it is possible to prevent water from flowing from the side provided with the external connector 6 through the shell 50 into the rear case 3.

Also, in the rear case 3 according to the present embodiment, the flange reception surface 11b1 as a recess receiving the flange part 51 is provided on the internal surface side rear case upper surface 11b of the rear case upper surface 11 on the internal surface side, and the flange reception surface bosses 16 and 17 are provided on the flange reception surface 11b1. As a result, the dimension of the interior of the rear case main body 10 in the height direction, which is a direction perpendicular to the rear case upper surface 11, can be reduced. Accordingly, the in-vehicle camera 4 can be housed in the in-vehicle camera case 1 even in a case where the in-vehicle camera 4 to be housed in the in-vehicle camera case 1 is large in size.

Also, in the rear case 3 according to the present embodiment, since the insertion hole 22 is formed at a position displaced from the center of the rear case upper surface 11 toward the side 12a or the side 14a, this configuration is suitable for a case where one wishes to arrange the camera substrate 5 in the in-vehicle camera case 1 connected to the connector module 40 at a position opposed to the position displaced from the center of the rear case upper surface 11 toward the side 12*a* or the side 14*a*.

Also, in the rear case 3 according to the present embodiment, even in a case where the space to form the boss members on the internal surface side rear case upper surface 11*b* is small, the side surface bosses 18 and 19 are provided, whereby the flange part 51 of the shell 50 can reliably be fixed to the rear case 3.

Also, in the rear case 3 according to the present embodiment, by configuring the side surface bosses 18, 19, 20, and 21 to extend from both the internal surface side rear case upper surface 11*b* and the rear case side surfaces 13, 14, and 15, the flange part 51 of the shell 50 can be fixed to the rear case 3 more firmly than in a case of configuring the side surface bosses 18, 19, 20, and 21 to extend only from the internal surface side rear case upper surface 11*b*.

Second Embodiment

In the present embodiment, an insertion hole 122 of a rear case 103 is formed at the center of a rear case upper surface 111, and the shape and the like of a flange part 151 of a shell 150 are changed. The other components are substantially the same as those in the first embodiment. In the rear case 103 according to the second embodiment, similar or identical components to those in the first embodiment are labeled with the same reference signs as those in the first embodiment illustrated in FIGS. 1 to 9B, and only different points will be described in detail.

Arrangement of the insertion hole in the rear case 103 is required to be determined according to the arrangement of the in-vehicle camera 4 and the in-vehicle camera substrate 5 inside the in-vehicle camera case 1. The present embodiment assumes a case where the in-vehicle camera 4 and the in-vehicle camera substrate 5 are arranged at positions opposed to the center of the rear case upper surface 111.

(Rear Case)

Figure 10A:
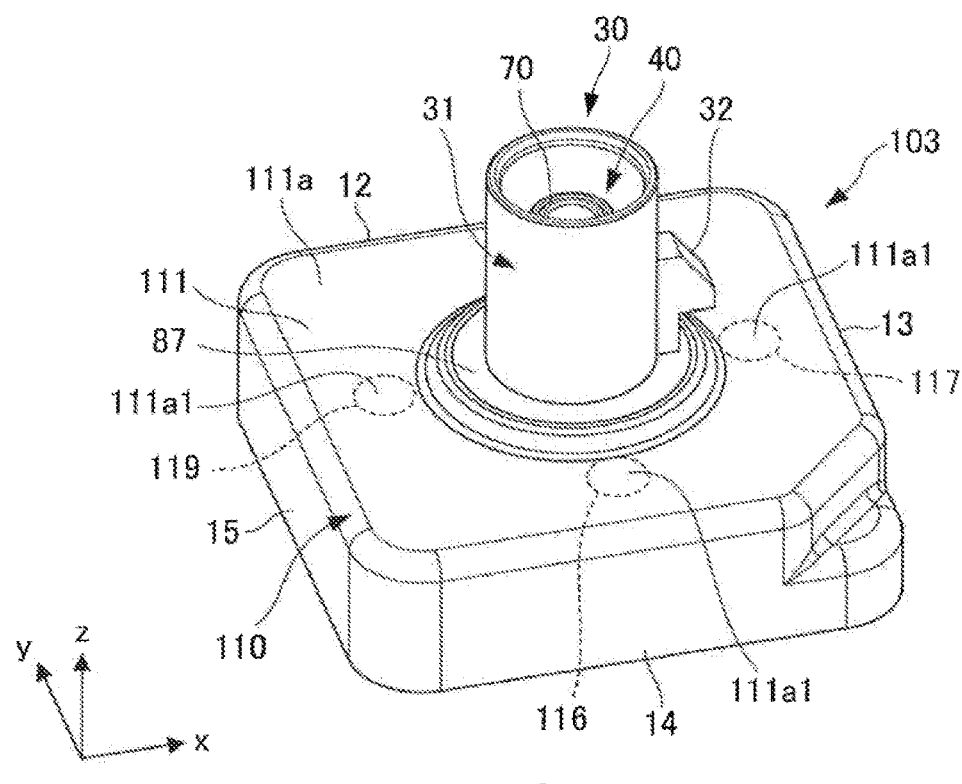
FIG. 10A is a perspective view illustrating a rear case according to a second embodiment of the present invention as viewed from the upper side.
Figure 10B:
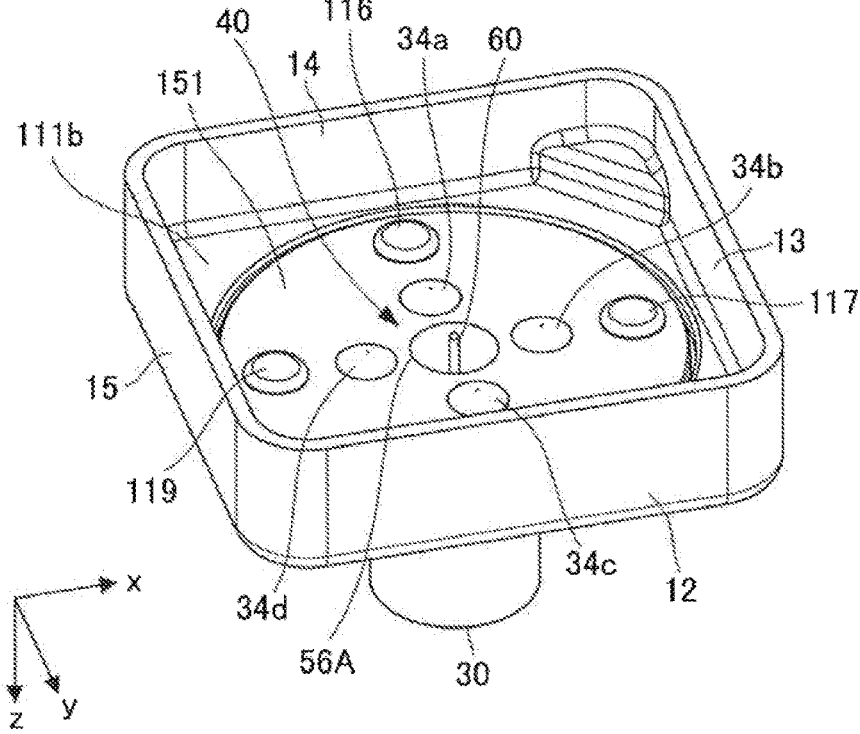
FIG. 10B is a perspective view illustrating the rear case according to a second embodiment of the present invention as viewed from the lower side.
Figure 11A:
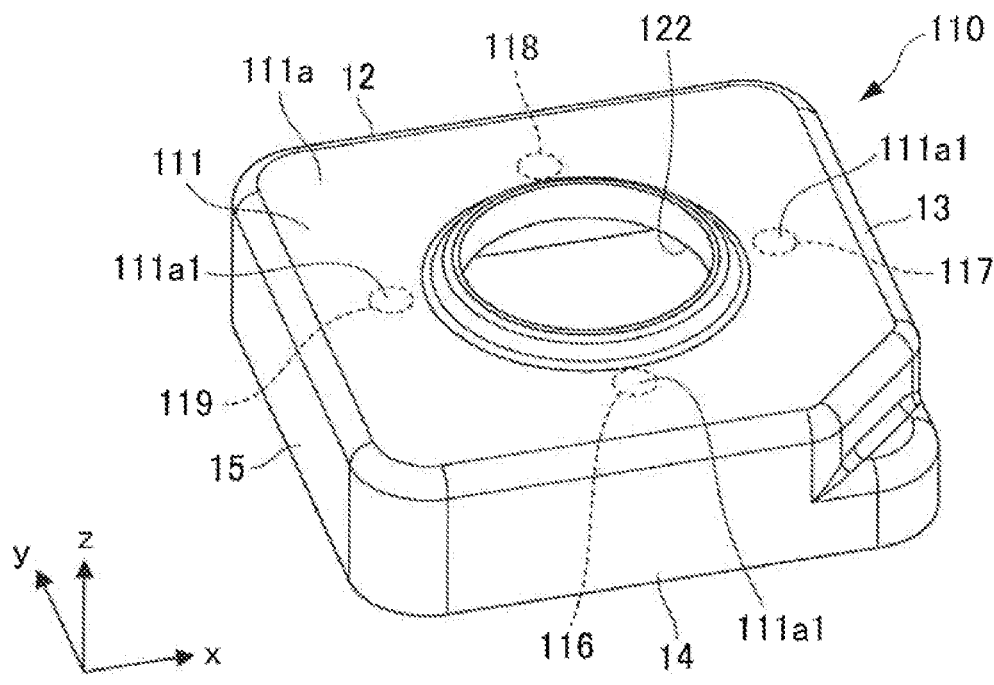
FIG. 11A is a perspective view illustrating a rear case main body according to the second embodiment of the present invention as viewed from the upper side.
Figure 11B:
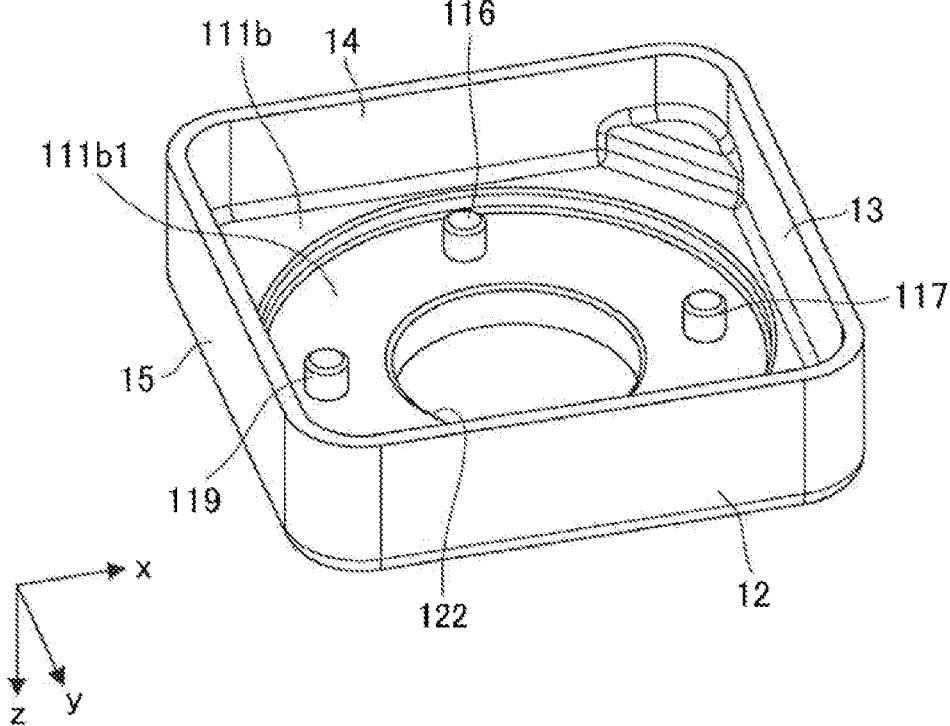
FIG. 11B is a perspective view illustrating the rear case main body according to the second embodiment of the present invention as viewed from the lower side.

FIGS. 10A and 10B illustrate the rear case according to the present embodiment, in which FIG. 10A is a perspective view as viewed from the upper side, and FIG. 10B is a perspective view as viewed from the lower side. FIGS. 11A and 11B illustrate a rear case main body according to the present embodiment, in which FIG. 11A is a perspective view as viewed from the upper side, and FIG. 11B is a perspective view as viewed from the lower side. As illustrated in FIGS. 11A and 11B, in an external surface side rear case upper surface 111*a* of the rear case 103, the position of the insertion hole 122 differs from that in the first embodiment. The insertion hole 122 has a circular shape and is formed at the center of the rear case upper surface 111. Along with this, the housing 30 is also arranged at the center of the rear case upper surface 111.

(Rear Case Upper Surface)

An internal surface side rear case upper surface 111*b* is provided with a flange reception surface 111*b*1. The flange reception surface 111*b*1 is a circular recess conforming to the shape of a flange part 151 to be described later. Note that the internal surface side rear case upper surface 111*b* defined in the present embodiment conceptually encompasses the flange reception surface 111*b*1. Therefore, for example, "on the flange reception surface 111*b*1" also means "on the internal surface side rear case upper surface 111*b*".

Figure 12:
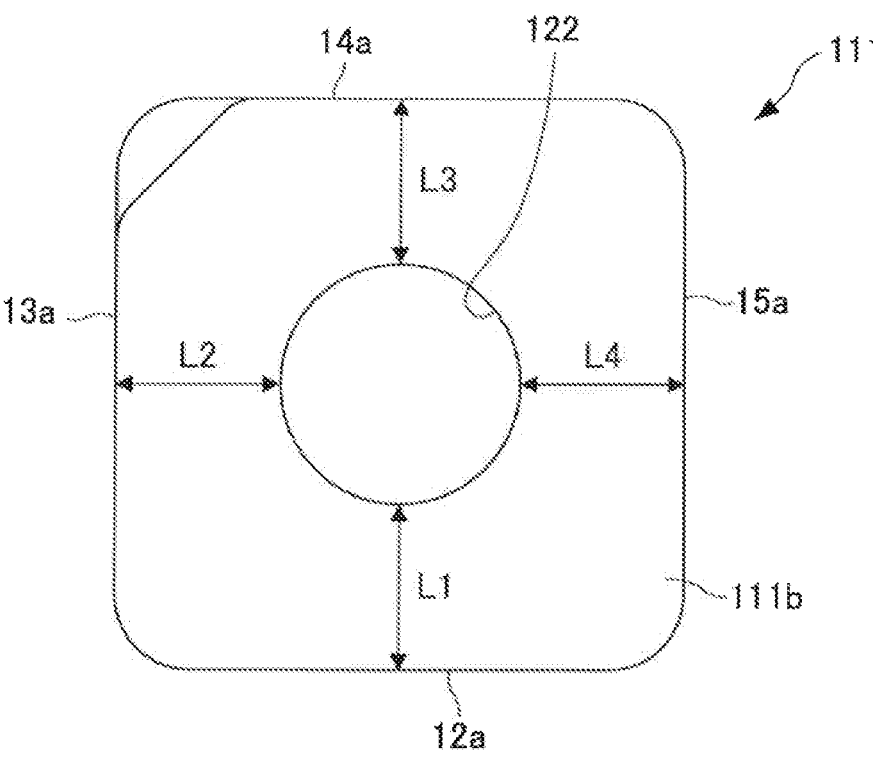
FIG. 12 is a schematic view describing the position of an insertion hole of the rear case main body according to the second embodiment of the present invention.

FIG. 12 illustrates the internal surface side rear case upper surface 111*b* when the rear case upper surface 111 is viewed from the lower side, that is, from the side in the negative z direction. In the present embodiment, since the insertion hole 122 is located at the center of the internal surface side rear case upper surface 111*b*, the insertion hole 122 is arranged at a position at which the relationships L1=L3 and L2=L4 are established. However, the insertion hole 122 may be arranged while slightly displaced from the center of the internal surface side rear case upper surface 111*b* within the following range.

$$0.5 < L1/L3 < 2, \text{ and } 0.5 < L2/L4 < 2$$

Unlike the case of the first embodiment, the side surface boss provided closer to the rear case side surface is not provided on the internal surface side rear case upper surface 111*b*. The reason for this is that, by forming the insertion hole 122 at the center of the rear case upper surface 111, there is a sufficiently large space for the flange reception surface 111*b*1 around the center of the internal surface side rear case upper surface 111*b*, four flange reception surface bosses 116, 117, 118, and 119 (to be described later) can be provided on the flange reception surface 111*b*1, and the rear case main body 110 and the shell 150 can be engaged with each other with sufficient strength.

(Crimping Reception Part)

Crimping reception surfaces 111*a*1 are provided at positions opposed to the flange reception surface bosses 116, 117, 118, and 119 around the insertion hole 122 on the external surface side rear case upper surface 111*a*.

(Boss Member)

The flange reception surface bosses 116, 117, 118, and 119 are boss members that project in the vertical direction from the rear case upper surface 111 toward the internal surface side of the rear case main body 110 and are provided on the internal surface side rear case upper surface 111*b*, which is a surface of the rear case upper surface 111 on the internal surface side to be engaged with the connector module 40. The flange reception surface bosses 116, 117, 118, and 119 are provided around the insertion hole 122 at equal spaces.

While only two flange reception bosses are provided in the first embodiment, four flange reception bosses are provided in the present embodiment since the flange reception surface 111*b*1 with sufficiently wide area is provided around the center of the internal surface side rear case upper surface 111*b*. Therefore, the rear case main body 110 and the shell 150 can be engaged with each other with sufficient strength without the side surface bosses provided as in the first embodiment.

(Shell)

Figure 13A:
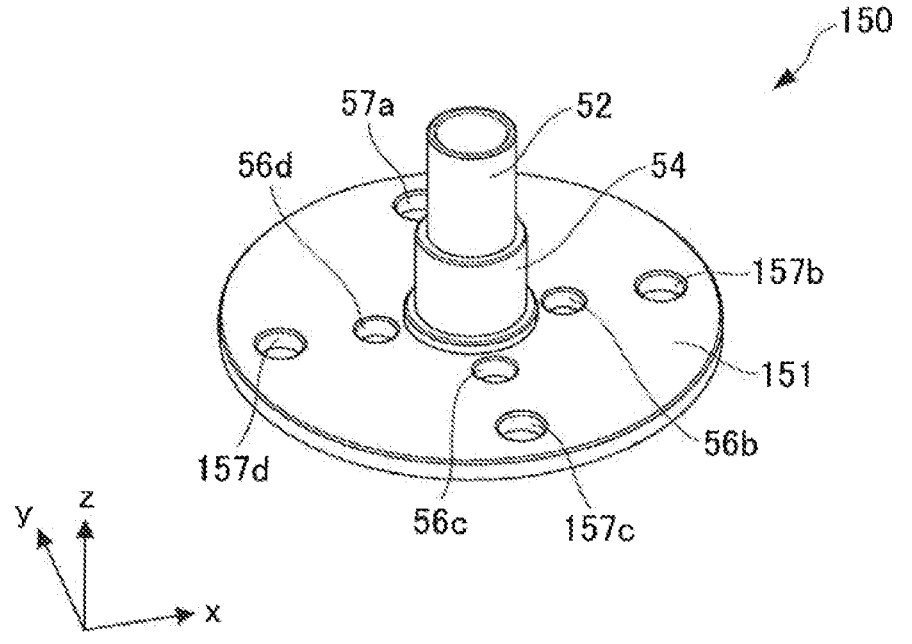
FIG. 13A is a perspective view illustrating a shell according to the second embodiment of the present invention as viewed from the upper side.
Figure 13B:
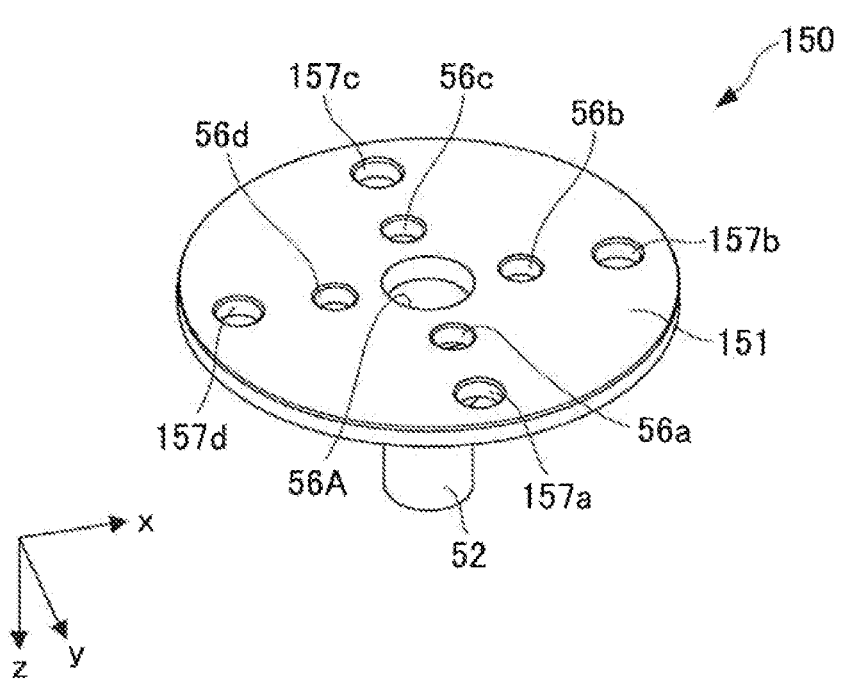
FIG. 13B is a perspective view illustrating the shell according to the second embodiment of the present invention as viewed from the lower side.

FIGS. 13A and 13B illustrate the shell according to the present embodiment, in which FIG. 13A is a perspective view as viewed from the upper side, and FIG. 13B is a perspective view as viewed from the lower side. The flange part 151 in the shell 150 is a circular plate-shaped member that is provided with the housing boss holes 56*a*, 56*b*, 56*c*, and 56*d* and rear case boss holes 157*a*, 157*b*, 157*c*, and 157*d* serving as a plurality of engagement holes and that is engaged with the rear case main body 110 and with the housing 30. In the present embodiment, unlike the case in the first embodiment, four rear case boss holes are formed. The rear case boss holes 157*a*, 157*b*, 157*c*, and 157*d* are engaged with the flange reception surface bosses 116, 117, 118, and 119, respectively, and the respective flange reception surface bosses are crimped.

In the above manner, in the rear case 103 according to the present embodiment, the insertion hole 122 is circular and is formed at the center of the rear case upper surface 111.

With this configuration, in the rear case 103 according to the present embodiment, since the insertion hole 122 is formed at the center of the rear case upper surface 111, this configuration is suitable for a case where one wishes to arrange the camera substrate 5 in the in-vehicle camera case 1 connected to the connector module 40 at a position opposed to the center of the rear case upper surface 111.

Third Embodiment

In the present embodiment, an insertion hole 222 of a rear case 203 is formed closer to a corner of a rear case upper surface 211, and the shape and the like of a flange part 251 of a shell 250 are changed. The other components are substantially the same as those in the first embodiment. In the rear case 203 according to the third embodiment, similar or identical components to those in the first embodiment are labeled with the same reference signs as those in the first embodiment illustrated in FIGS. 1 to 9B, and only different points will be described in detail.

Arrangement of the insertion hole in the rear case 203 is required to be determined according to the arrangement of the in-vehicle camera 4 and the in-vehicle camera substrate 5 inside the in-vehicle camera case 1. The present embodiment assumes a case where the in-vehicle camera 4 and the in-vehicle camera substrate 5 are arranged at positions opposed to the position and closer to the corner of the rear case upper surface 211.

(Rear Case)

Figure 14A:
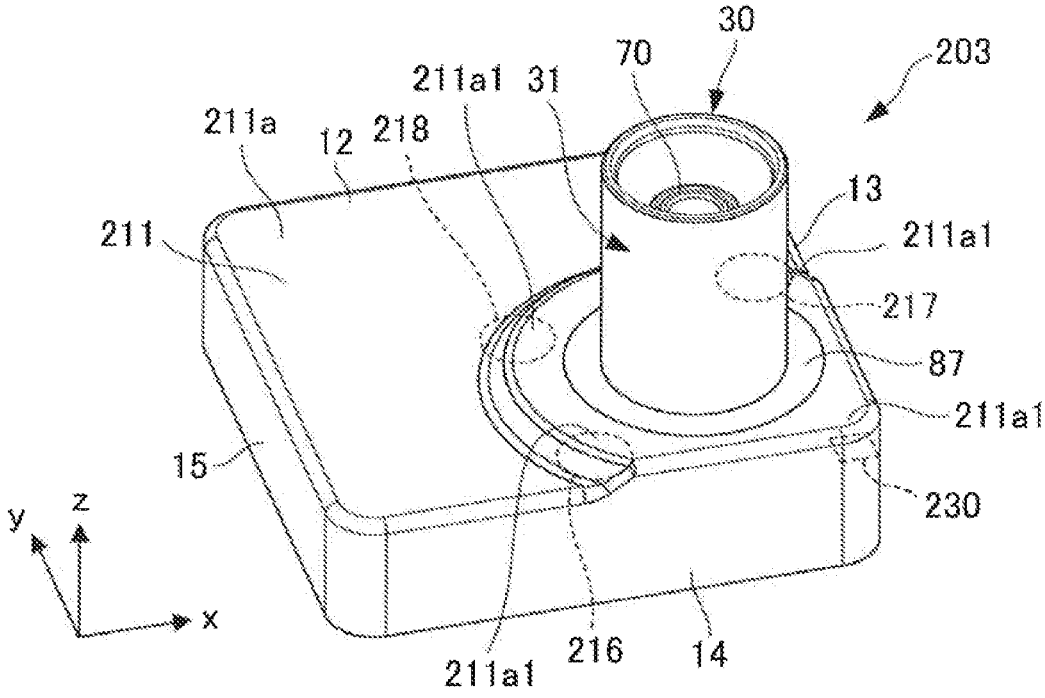
FIG. 14A is a perspective view illustrating a rear case according to a third embodiment of the present invention as viewed from the upper side.
Figure 14B:
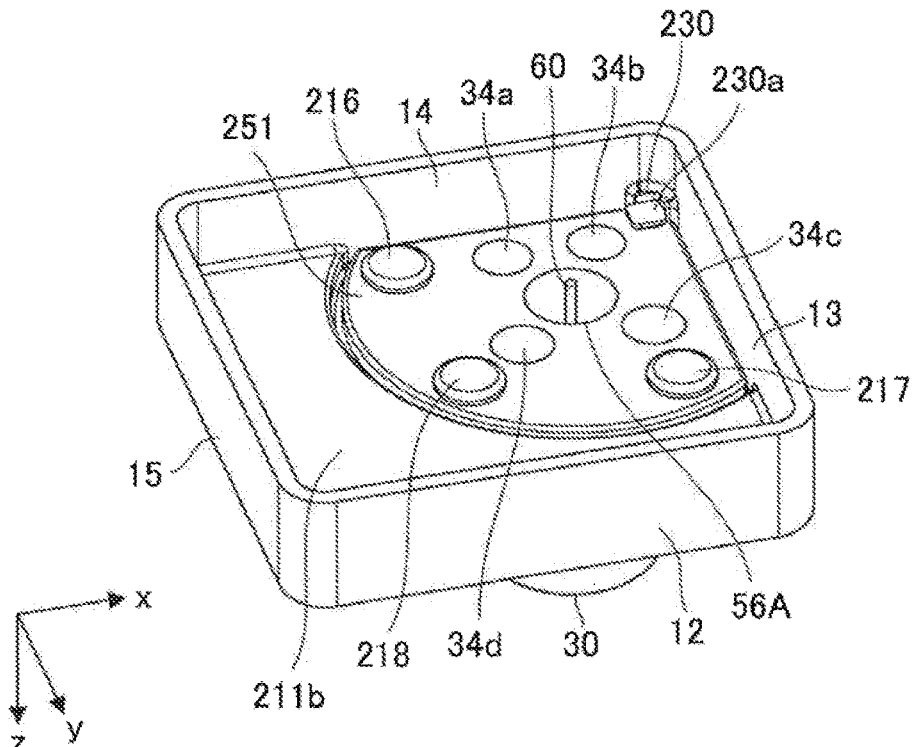
FIG. 14B is a perspective view illustrating the rear case according to the third embodiment of the present invention as viewed from the lower side.
Figure 15A:
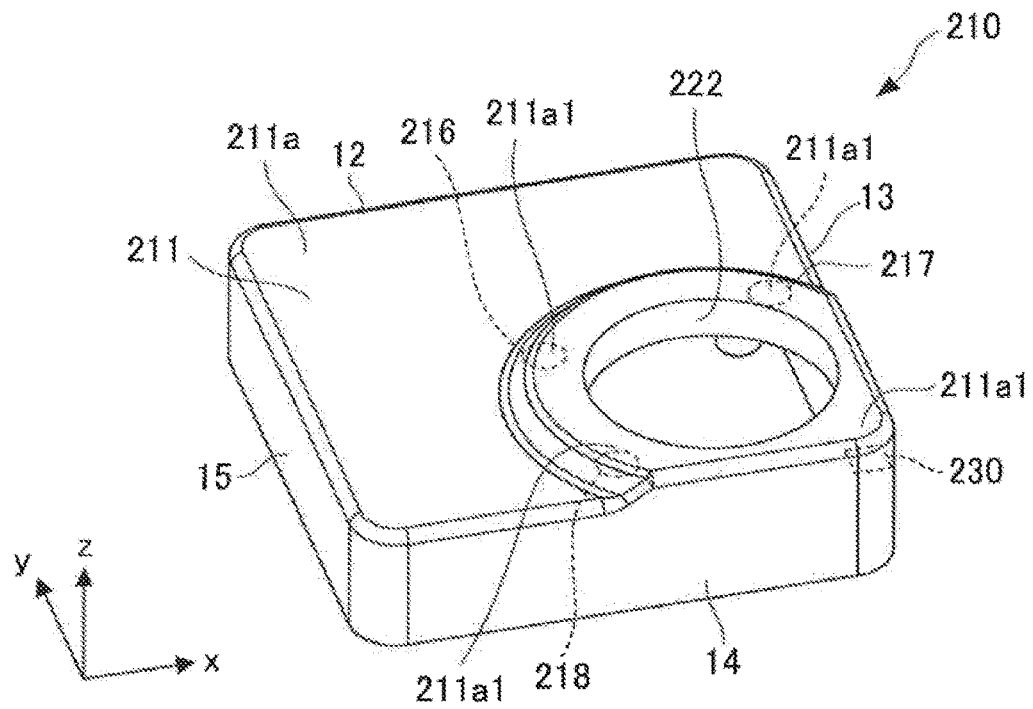
FIG. 15A is a perspective view illustrating a rear case main body according to the third embodiment of the present invention as viewed from the upper side.
Figure 15B:
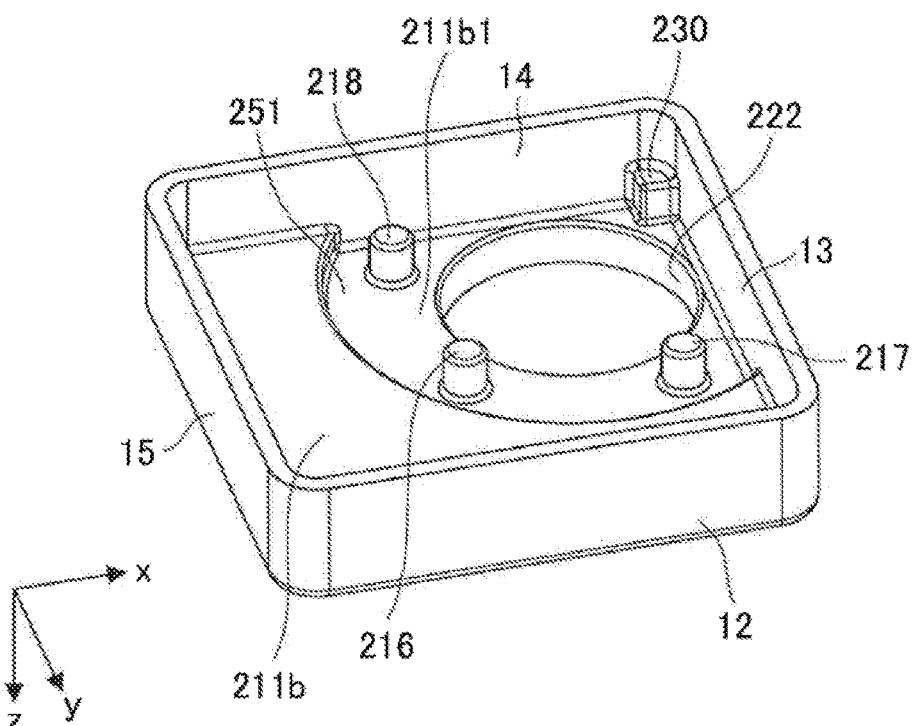
FIG. 15B is a perspective view illustrating the rear case main body according to the third embodiment of the present invention as viewed from the lower side.

FIGS. 14A and 14B illustrate the rear case according to the present embodiment, in which FIG. 14A is a perspective view as viewed from the upper side, and FIG. 14B is a perspective view as viewed from the lower side. FIGS. 15a and 15B illustrate a rear case main body 210 according to the present embodiment, in which FIG. 15A is a perspective view as viewed from the upper side, and FIG. 15B is a perspective view as viewed from the lower side. As illustrated in FIGS. 15A and 15B, in an external surface side rear case upper surface 211a of the rear case 203, the position of the insertion hole 222 differs from that in the first embodiment. The insertion hole 222 has a circular shape and is formed closer to the corner of the rear case upper surface 211. Along with this, the housing 30 is also arranged closer to the corner of the rear case upper surface 211.

(Rear Case Upper Surface)

An internal surface side rear case upper surface 211b is provided with a flange reception surface 211b1. The flange reception surface 211b1 is a recess having a similar shape to a fan shape obtained by taking a part out of a circle and conforming to the shape of a flange part 251 to be described later. Note that the internal surface side rear case upper surface 211b defined in the present embodiment conceptually encompasses the flange reception surface 211b1. Therefore, for example, "on the flange reception surface 211b1" also means "on the internal surface side rear case upper surface 211b".

Figure 16:
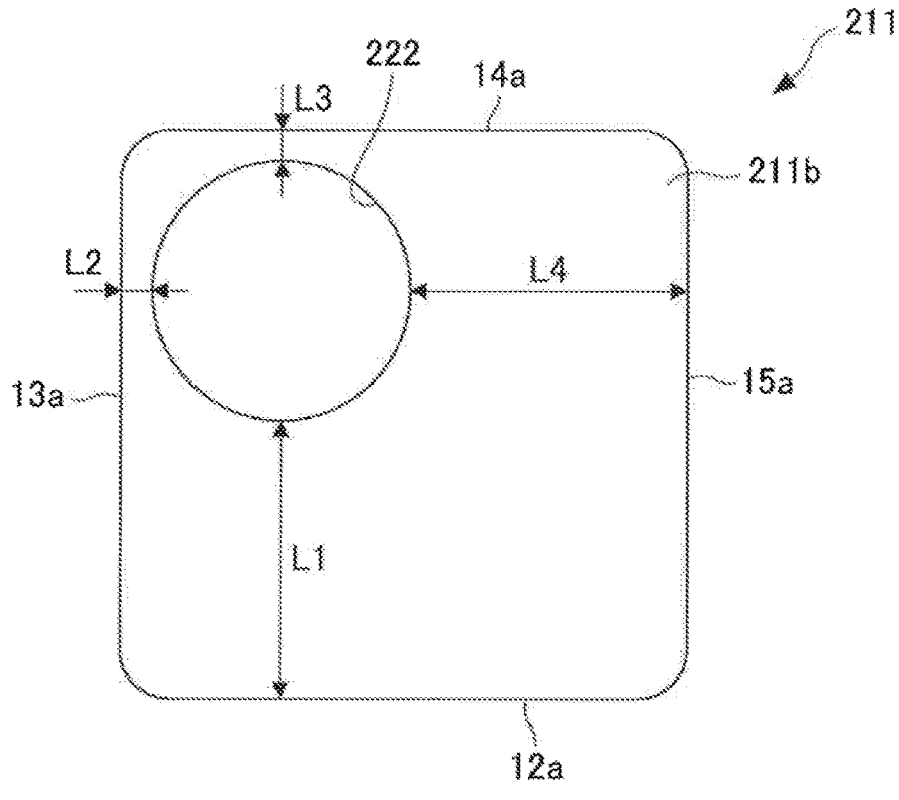
FIG. 16 is a schematic view describing the position of an insertion hole of the rear case main body according to the third embodiment of the present invention.

FIG. 16 illustrates the internal surface side rear case upper surface 211b when the rear case upper surface 211 is viewed from the lower side, that is, from the side in the negative z direction. In the present embodiment, since the insertion hole 222 is located closer to the corner of the rear case upper surface 211, the insertion hole 222 is arranged while displaced from the center of the rear case upper surface 211 so that L1 and L3 have different values and so that L2 and L4 have different values. More specifically, L3<L1 and L2<L4 are satisfied.

Unlike the first embodiment, only one side surface boss 230 is provided closer to the corner of the rear case side surface on the internal surface side rear case upper surface 211b. The reason for this is the following. By forming the insertion hole 222 at the corner of the rear case upper surface 211, three flange reception surface bosses 216, 217, and 218 (to be described later) are provided on the flange reception surface 211b1. However, no flange reception surface boss can be provided at a position closer to the corner in consideration of the space occupied by the flange reception surface 211b1. Hence, the side surface boss 230 is arranged to maintain sufficient strength for engagement between the rear case main body 210 and the shell 250 particularly at the corner.

(Crimping Reception Part)

Crimping reception surfaces 211a1 are provided at positions opposed to the flange reception surface bosses 216, 217, and 218 around the insertion hole 222 on the external surface side rear case upper surface 211a. As illustrated in FIGS. 14A and 15A, the crimping reception surfaces 211a1 are provided at portions, around the insertion hole 222, having a predetermined thickness. In this manner, since the crimping reception surfaces 211a1 each have a predetermined thickness, the crimping reception surfaces 211a1 can receive pressure applied to the rear case upper surface at the time of crimping. Therefore, the structural strength of the in-vehicle camera rear case can further be enhanced.

(Boss Member)

The flange reception surface bosses 216, 217, and 218 are boss members that project in the vertical direction from the rear case upper surface 211 toward the internal surface side of the rear case main body 210 and are provided on the internal surface side rear case upper surface 211b, which is a surface of the rear case upper surface 211 on the internal surface side to be engaged with the connector module 40. The flange reception surface bosses 216, 217, and 218 are provided around the insertion hole 222 on the side away from the corner.

While only two flange reception bosses are provided in the first embodiment, three flange reception bosses are provided in the present embodiment since the flange reception surface 211b1 is provided closer to the corner of the internal surface side rear case upper surface 211b with a sufficiently large area.

One side surface boss 230 is provided on the flange reception surface 211b1 at the corner between the rear case side surface 13 and the rear case side surface 14 on the internal surface side rear case upper surface 211b. That is, the side surface boss 230 is provided at the corner on the flange reception surface 211b1 along the rear case side surfaces 13 and 14, which are side surfaces corresponding to the L3 side as the shorter one out of the two, L1 and L3, and the L2 side as the shorter one out of the two, L2 and L4. Although the number of the side surface bosses is smaller than in the first embodiment, more flange reception surface bosses are provided in the present embodiment than in the first embodiment. Therefore, the rear case main body 210 and the shell 250 can be engaged with each other with sufficient strength without four side surface bosses provided as in the first embodiment. While FIGS. 15A and 15B illustrate a state of the side surface boss 230 before being crimped, FIGS. 14A and 14B illustrate a state of the side surface boss 230 after being crimped. In the state after being crimped, a deformed part 230a is formed which is deformed after a part of the side surface boss 230 is crimped.

(Shell)

Figure 17A:
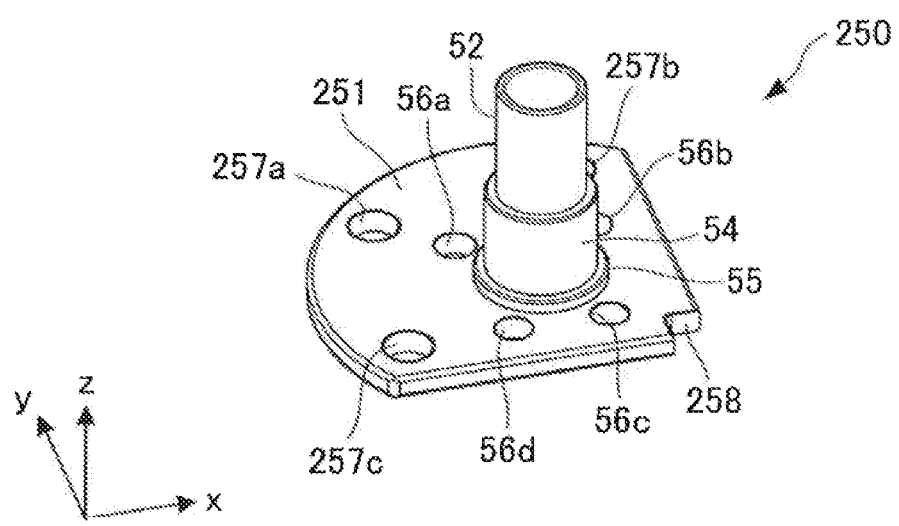
FIG. 17A is a perspective view illustrating a shell according to the third embodiment of the present invention as viewed from the upper side.
Figure 17B:
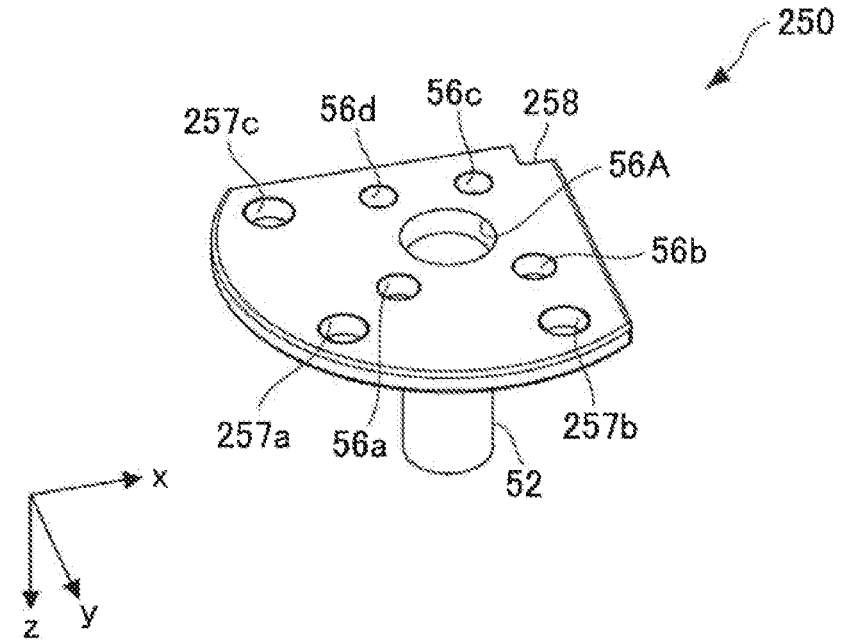
FIG. 17B is a perspective view illustrating the shell according to the third embodiment of the present invention as viewed from the lower side.

FIGS. 17A and 17B illustrate the shell according to the present embodiment, in which FIG. 17A is a perspective view as viewed from the upper side, and FIG. 17B is a perspective view as viewed from the lower side. The flange part 251 in the shell 250 is a member, having a similar shape to a fan shape obtained by taking a part out of a circle, provided with the housing boss holes 56a, 56b, 56c, and 56d and rear case boss holes 257a, 257b, and 257c serving as a plurality of engagement holes, and a cut-out part 258, with the member being engaged with the rear case main body 210 and with the housing 30. In the present embodiment, unlike the first embodiment, three rear case boss holes are formed. The rear case boss holes 257a, 257b, and 257c are engaged with the flange reception surface bosses 216, 217, and 218, respectively, and the cut-out part 258 is engaged with the side surface boss 230. Then, the respective flange reception surface bosses and the side surface boss are crimped.

In the above manner, in the rear case 203 according to the present embodiment, the insertion hole 222 is formed at the position displaced from the center of the rear case upper surface 211 and closer to the corner so that L1 and L3 have different values and so that L2 and L4 have different values.

Also, the boss member, which is at least one boss member, is the side surface boss 230 provided at the corner on the internal surface side rear case upper surface 211b, and the side surface boss 230 is crimped in a state where the flange part 251 is engaged with the flange reception surface 211b1.

Also, the side surface boss 230 is provided on the flange reception surface 211b1, and the flange part 251 includes the cut-out part 258. The side surface boss 230 is thus engaged with the cut-out part 258 and crimped.

Also, the boss member on the shorter one out of L1 and L3, and on the shorter one out of L2 and L4 is the side surface boss 230 provided on the internal surface side rear case upper surface 211b.

With this configuration, in the rear case 203 according to the present embodiment, since the insertion hole 222 is formed at a position displaced from the center of the rear case upper surface 211 toward the side 12a or the side 14a, and displaced toward the side 13a or the side 15a, this configuration is suitable for a case where one wishes to arrange the in-vehicle camera substrate 5 in the in-vehicle camera case 1 connected to the connector module 40 at a position opposed to the position displaced from the center of the rear case upper surface 211 toward the side 12a or the side 14a, and displaced toward the side 13a or the side 15a, that is, a position closer to the corner of the rear case upper surface 211.

Also, this configuration, in which the side surface boss 230 is provided at the corner on the internal surface side rear case upper surface 211b and crimped, is suitable particularly for a case where the outer edge of the flange part 251 is located closer to any corner on the internal surface side rear case upper surface 211b.

Also, since the flange part 251 includes the cut-out part 258, the flange part 251 can be arranged on the recessed flange reception surface 211b1. Therefore, the dimension in the height direction, which is a direction perpendicular to the rear case upper surface 211, can be reduced.

Also, by providing the side surface boss 230 even in a case where the internal surface side rear case upper surface 211b does not have enough space to provide the boss member, the flange part 251 of the shell 250 can reliably be fixed to the rear case 203.

As described above, the in-vehicle camera rear case and the in-vehicle camera case according to the embodiment(s) of the present invention provide advantageous effects in which the occurrence frequency of defective products at the time of manufacture can be reduced while the structural strength thereof is maintained, and are useful for various in-vehicle camera rear cases and in-vehicle camera cases.

22

REFERENCES SIGNS LIST

1 in-vehicle camera case
2 front case
3, 103, 203 rear case (in-vehicle camera rear case)
4 in-vehicle camera
5 in-vehicle camera substrate
6 external connector
7 cable
10, 110, 210 rear case main body
11, 111, 211 rear case upper surface
11a, 111a, 211a external surface side rear case upper surface
11a1, 111a1, 211a1 crimping reception surface (crimping reception part)
11b, 111b, 211b internal surface side rear case upper surface
11b1, 111b1, 211b1 flange reception surface
12, 13, 14, 15 rear case side surface
12a, 13a, 14a, 15a side (first side, second side, third side, forth side)
16, 17 flange reception surface boss (boss member)
116, 117, 118, 119 flange reception surface boss (boss member)
216, 217, 218 flange reception surface boss (boss member)
18, 19, 20, 21, 230 side surface boss (boss member)
22, 122, 222 insertion hole
30 housing
31 cylindrical part
32 lock part
33 housing flange
34a, 34b, 34c, 34d flange boss
40 connector module
50, 150, 250 shell
51, 151, 251 flange part
52 upper shell
54 lower shell
55 shell flange
56A central penetration hole
56a, 56b, 56c, 56d housing boss hole
57a, 57b rear case boss hole (engagement hole)
157a, 157b, 157c, 157d rear case boss hole (engagement hole)
257a, 257b, 257c rear case boss hole (engagement hole)
60 terminal
70 insulator
71 body part
72 O ring groove part
73 terminal penetration hole
85 shell O ring
86 insulator O ring
87 adhesive
258 cut-out part

CITATION LIST

Patent Literature 1: Japanese Patent No. 6039514

The invention claimed is:

1. An in-vehicle camera rear case comprising:
a rear case main body that is connected to a front case in an opposed manner to form a space in which an in-vehicle camera is housed, is provided with an insertion hole, is opened at one surface, and has a box shape;
a connector module that is inserted in the insertion hole and is engaged with the rear case main body, and at least a part of which projecting out of the rear case main body is made of a resin; and a housing that is engaged with the connector module and houses the connector module, wherein the rear case main body includes:

a rear case upper surface opposed to the front case;

a plurality of rear case side surfaces provided perpendicularly along an outer periphery of the rear case upper surface;

a boss member that projects in a vertical direction from the rear case upper surface toward an internal surface side of the rear case main body and is provided on a surface of the rear case upper surface on the internal surface side to be engaged with the connector module; and a crimping reception part provided at a position, opposed to the boss member, on a surface of the rear case upper surface, which is on an external surface side of the rear case main body; and wherein the boss member is crimped by applying pressure without heat in a state of being engaged with the connector module; and the crimping reception part has a thickness that can receive the applied pressure.

2. The in-vehicle camera rear case according to claim 1, wherein the connector module includes a shell that serves as a conductor made of metal and includes a cylindrical portion, a terminal that is arranged along a central axis inside the shell and is conductive from one end to another end thereof, and an insulator that is provided between the shell and the terminal, holds the terminal, and has an insulation property.

3. The in-vehicle camera rear case according to claim 2, wherein:

the shell further includes a flange part that is provided with a plurality of engagement holes, is engaged with the rear case main body and the housing, and has a flat plate shape; and when the flange part is engaged with the boss member of the rear case main body, the boss member penetrates the plurality of engagement holes.

4. The in-vehicle camera rear case according to claim 3, wherein:

the rear case main body is provided with a flange reception surface, which is formed as a recess for receiving at least a part of the flange part having the flat plate shape in a thickness direction thereof, on the surface of the rear case upper surface on the internal surface side; and the boss member is provided on the flange reception surface.

5. The in-vehicle camera rear case according to claim 4, wherein when four sides serving as an outer periphery of the rear case upper surface are referred to as a first side, a second side, a third side, and a fourth side, when the first side and the third side are opposed to each other, and the second side and the fourth side are opposed to each other, and when a closest distance from an outer edge of the insertion hole to the first side is referred to as L1, a closest distance to the second side is referred to as L2, a closest distance to the third side is referred to as L3, and a closest distance to the fourth side is referred to as L4, a position of the insertion hole is displaced from a center of the rear case upper surface so that the L1 and the L3 have different values.

6. The in-vehicle camera rear case according to claim 5, wherein the position of the insertion hole is displaced from the center of the rear case upper surface so that the L2 and the L4 have different values.

7. The in-vehicle camera rear case according to claim 6, wherein the boss member on a shorter one out of the L1 and the L3, and on a shorter one out of the L2 and the L4 is a side surface boss provided on the internal surface side rear case upper surface.

8. The in-vehicle camera rear case according to claim 5, wherein:

the boss member, which is at least one boss member, on a shorter one out of the L1 and the L3, is a side surface boss provided on an internal surface side rear case upper surface; and the side surface boss is crimped in a state where the flange part is engaged with the flange reception surface.

9. The in-vehicle camera rear case according to claim 8, wherein the side surface boss is formed to extend from the rear case side surface.

10. The in-vehicle camera rear case according to claim 4, wherein:

the boss member, which is at least one boss member, is a side surface boss provided at a corner on an internal surface side rear case upper surface; and the side surface boss is crimped in a state where the flange part is engaged with the flange reception surface.

11. The in-vehicle camera rear case according to claim 10, wherein:

the side surface boss is provided on the flange reception surface;

the flange part includes a cut-out part; and the side surface boss is engaged with the cut-out part and crimped.

12. The in-vehicle camera rear case according to claim 3, wherein the shell includes a shell flange having a larger outside diameter and a shell O ring for waterproofing to be fitted between the shell flange and an internal surface of the housing.

13. The in-vehicle camera rear case according to claim 3, wherein:

the shell includes a shell flange having a larger outside diameter and a shell O ring for waterproofing to be fitted between the shell flange and an internal surface of the housing;

the rear case main body is provided with a flange reception surface, which is formed as a recess for receiving at least a part of the flange part having the flat plate shape in a thickness direction thereof, on the surface of the rear case upper surface on the internal surface side; and the boss member is provided on the flange reception surface.

14. The in-vehicle camera rear case according to claim 13, wherein when four sides serving as an outer periphery of the rear case upper surface are referred to as a first side, a second side, a third side, and a fourth side, when the first side and the third side are opposed to each other, and the second side and the fourth side are opposed to each other, and when a closest distance from an outer edge of the insertion hole to the first side is referred to as L1, a closest distance to the second side is referred to as L2, a closest distance to the third side is referred to as L3, and a closest distance to the fourth side is referred to as L4, a position of the insertion hole is displaced from a center of the rear case upper surface so that the L1 and the L3 have different values.

15. The in-vehicle camera rear case according to claim 14, wherein the position of the insertion hole is displaced from the center of the rear case upper surface so that the L2 and the L4 have different values.

16. The in-vehicle camera rear case according to claim 13, wherein:

the boss member, which is at least one boss member, is a side surface boss provided at a corner on an internal surface side rear case upper surface; and the side surface boss is crimped in a state where the flange part is engaged with the flange reception surface.

17. The in-vehicle camera rear case according to claim 16, wherein:

the side surface boss is provided on the flange reception surface;

the flange part includes a cut-out part; and the side surface boss is engaged with the cut-out part and crimped.

18. The in-vehicle camera rear case according to claim 2, wherein the shell includes a shell flange having a larger outside diameter and a shell O ring for waterproofing to be fitted between the shell flange and an internal surface of the housing.

19. The in-vehicle camera rear case according to claim 1, wherein the insertion hole has a circular shape and is formed at a center of the rear case upper surface.

20. An in-vehicle camera case configured to have a space in which an in-vehicle camera is housed and which is formed by connecting the in-vehicle camera rear case according to claim 1 to a front case.

* * * * *